(12) United States Patent
Nishiura et al.

(10) Patent No.: US 8,314,204 B2
(45) Date of Patent: Nov. 20, 2012

(54) ENDLESS TUBULAR POLYIMIDE FILM

(75) Inventors: Naoki Nishiura, Moriyama (JP);
Takashi Kuraoka, Moriyama (JP);
Naoyuki Maruichi, Moriyama (JP);
Tsutomu Yoshida, Moriyama (JP);
Junya Kanetake, Moriyama (JP); Toru Murakami, Ube (JP)

(73) Assignees: Gunze Limited, Kyoto (JP); Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 13/280,713

(22) Filed: Oct. 25, 2011

(65) Prior Publication Data
US 2012/0040121 A1    Feb. 16, 2012

Related U.S. Application Data

(62) Division of application No. 10/591,326, filed as application No. PCT/JP2004/015309 on Oct. 8, 2004, now Pat. No. 8,097,693.

(30) Foreign Application Priority Data

| Mar. 3, 2004 | (JP) | 2004-59582 |
| Mar. 3, 2004 | (JP) | 2004-59590 |
| Mar. 3, 2004 | (JP) | 2004-59593 |
| Apr. 6, 2004 | (JP) | 2004-112166 |

(51) Int. Cl.
*C08G 69/26* (2006.01)

(52) U.S. Cl. .......... 528/353; 524/495; 524/496

(58) Field of Classification Search .......... 528/353; 524/495, 496

See application file for complete search history.

(56) References Cited

U.S. PATENT DOCUMENTS

| 4,190,936 A | 3/1980 | Van Renssen |
| 4,467,000 A | 8/1984 | Economy et al. |
| 5,138,028 A | 8/1992 | Paul et al. |
| 5,891,986 A * | 4/1999 | Yamaguchi et al. .......... 528/310 |
| 6,303,054 B1 | 10/2001 | Kanetake et al. |

FOREIGN PATENT DOCUMENTS

| JP | A-56-038324 | 4/1981 |
| JP | A-63-37136 | 2/1988 |
| JP | A-10-182820 | 7/1998 |
| JP | A-10-282712 | 10/1998 |
| JP | A-2000-263568 | 9/2000 |
| JP | A-2001-142313 | 5/2001 |
| JP | A-2001-227265 | 8/2001 |
| JP | A-2001-241313 | 9/2001 |
| JP | A-2001-277264 | 10/2001 |
| JP | A-2001-277265 | 10/2001 |
| JP | A-2002-292656 | 10/2002 |
| JP | A-2003-213014 | 7/2003 |
| JP | A-2003-261768 | 9/2003 |
| JP | A-2003-277502 | 10/2003 |
| JP | A-2004-323834 | 11/2004 |
| JP | A-2005-025052 | 1/2005 |

OTHER PUBLICATIONS

M. Hasegawa et al. "Improvement of Thermoplasticity for s-BPDA/PDA by Copolymerization and Blend with Novel Asymmetric BPDA-based on Polyimides." Journal of Polymer Science. vol. 37, No. 17 (Sep. 1, 1999): pp. 2499-2511.
M. Hasegawa et al. "Structure and Properties of Novel Asymmetric Biphenyl Type Polyimides" American Chemical Society, Macromolecules. vol. 32, No. 2 (Jan. 26, 1999): pp. 387-396.
Wilson et al. *Polyimides*. Blackie & Son Ltd.: New York (1990) p. 1-2, scheme 1.2.
Office Action mailed Jul. 19, 2011 from the Japanese Patent Office in corresponding JP patent application No. 2010-177303.
International Search Report mailed Dec. 14, 2004 in corresponding International application No. PCT/JP2004/015309 (English translation attached).
Restriction Requirement mailed Apr. 6, 2009 from the US Patent Office in corresponding U.S. Appl. No. 10/591,326.
Office Action mailed Jul. 1, 2009 from the US Patent Office in corresponding U.S. Appl. No. 10/591,326.
Final Office Action mailed Jan. 5, 2010 from the US Patent Office in corresponding U.S. Appl. No. 10/591,326.
Office Action mailed Jul. 27, 2010 from the US Patent Office in corresponding U.S. Appl. No. 10/591,326.
Final Office Action mailed Jan. 4, 2011 from the US Patent Office in corresponding U.S. Appl. No. 10/591,326.
Notice of Allowance mailed Sep. 30, 3011 from the US Patent Office in corresponding U.S. Appl. No. 10/591,326.

\* cited by examiner

*Primary Examiner* — Shane Fang
(74) *Attorney, Agent, or Firm* — Posz Law Group, PLC

(57) ABSTRACT

The present invention provides a method for producing a high-quality nonconductive or semi-conductive seamless (jointless) tubular polyimide film in a simple, efficient, and economical manner, and the like. More specifically, the invention relates to an electrically non-conductive or electrically semi-conductive seamless tubular polyimide film comprising polyimide having at least two aromatic tetracarboxylic acid derivatives comprising 15 to 55 mol % of asymmetric aromatic tetracarboxylic acid component and 85 to 45 mol % of symmetric aromatic tetracarboxylic acid component and at least one aromatic diamine component, in which, as required, a specific amount of carbon black is dispersed, and relates to a method for producing the same.

6 Claims, No Drawings

ENDLESS TUBULAR POLYIMIDE FILM

CROSS REFERENCE TO RELATED APPLICATIONS

The present application is a divisional of U.S. application Ser. No. 10/591,326 filed on Aug. 31, 2006, which in turn is a PCT National Stage application of PCT International Application No. PCT/JP2004/015309 filed on Oct. 8, 2004, which claims priority from Japanese Patent Applications No. 2004-59593 filed on Mar. 3, 2004; No. 2004-59590 filed on Mar. 3, 2004; No. 2004-59582 filed on Mar. 3, 2004; and No. 2004-112166 filed on Jun. 4, 2004, the disclosures of which are incorporated herein by reference.

TECHNICAL FIELD

The present invention relates to an improved non-conductive or semi-conductive seamless tubular polyimide film and a production method therefor. The semi-conductive seamless tubular polyimide film is used, for example, as an intermediate transfer belt and the like in an electrophotographic system for use in a color printer, color copier, etc.

BACKGROUND OF THE INVENTION

It is well known that a non-conductive tubular polyimide film is generally processed into a belt form to be used, for example, as a belt for conveying heated materials and a fixing belt for use in an electrophotographic system.

Moreover, a semi-conductive tubular polyimide film comprising conductive carbon black mixed and dispersed in a non-conductive tubular polyimide film is used as an intermediate transfer belt for use in, for example, copiers, printers, facsimiles, and presses.

It is known that such non-conductive and semi-conductive tubular polyimide films are prepared by forming a predetermined film-formation starting material into a flat film, and jointing both ends of the flat film to form a tubular shape; or by forming a predetermined film-formation starting material into a seamless tubular film by centrifugal casting in a single step. Japanese Unexamined Patent Publication No. 2000-263568 filed by the applicant of the present application discloses performing centrifugal casting under substantially no centrifugal force to form a tubular shape.

In general, a solution of polyamide acid (or polyamic acid) with high-molecular-weight (a number average molecular weight: usually about 10000 to about 30000), i.e., a polymer precursor of a polyimide, is used as a film-formation starting material for such tubular polyimide films.

More specifically, the polyamic acid solution is produced by polycondensation of aromatic tetracarboxylic dianhydride and an equimolar amount of aromatic diamine in an organic polar solvent at low temperatures at which no imidization occurs. Examples of the aromatic tetracarboxylic dianhydride include 1,2,4,5-benzene tetracarboxylic dianhydride, 3,3',4,4'-biphenyl tetracarboxylic dianhydride, 3,3',4,4'-benzophenone tetracarboxylic dianhydride, 2,3,6,7-naphthalene tetracarboxylic dianhydride, etc., in which the anhydride groups are point-symmetrically arranged. Examples of aromatic diamines include p-phenylenediamine, 4,4'-diaminodiphenylether, 4,4'-diaminodiphenylmethane, etc.

The method for producing a polyimide film ordinarily comprises three steps: preparing a polyamic acid solution as a film-formation starting material; forming this into a polyamic acid film; and imidizing the formed film.

However, a polyamic acid solution obtained by the preparation steps described above is disadvantageous in that a partial gel is likely to be gradually formed during storage due to the pot life thereof. Such partial formation of gel is likely to occur at high temperatures, but it proceeds with time even at low temperatures. Thus, even when the gel formation is negligible, it is a matter of course that the physical properties of the finished polyimide film prepared from such a solution are adversely affected and, in addition, the flatness of the film is diminished. In particular, the addition of conductive carbon black to the polyimide film leads to an increase in the variation of electrical resistance.

Moreover, since the solubility of polyamic acid resins in an organic polar solvent is limited, it is difficult to form a solution containing a high concentration thereof (at most 25% by weight in terms of the nonvolatile matter content in a solution).

In some cases, the addition of carbon black to the polyamic acid solution sharply increases viscosity, which makes it difficult to grind the carbon black by the impulsive force generated between the balls in a dispersing apparatus such as a ball mill. In order to uniformly dispersing carbon black in a polyamic acid solution, pulverizability of carbon black with a disperser and the interfacial phenomenon referred to as "wetting" of carbon black disintegrated by a solvent are required. Therefore, a large amount of organic polar solvent is added to uniformly disperse the carbon black. As a result, however, the nonvolatile matter content in the obtained masterbatch solution containing a high concentration of carbon black is as low as 16% by weight or less.

Furthermore, a solution containing a low concentration of polyamic acid has drawbacks in that a thicker film is difficult to form in a single step, and in that since a larger amount of solvent is required, the period of time for removing the large amount of solvent by evaporation is prolonged.

Because the three steps described above are included in the polyimide film preparation method, the entire process requires considerable time and cost. Thus, there is room for improving efficiency and cost.

Japanese Unexamined Patent Publication No. 10-182820 discloses a film-formation method using a polyimide precursor composition comprising as a main component a monomer having a mixture of aromatic tetracarboxylic acid component comprising as a main component asymmetric aromatic tetracarboxylic acid and/or ester thereof (specifically 60 mol % or more of 2,3,3'4'-biphenyl tetracarboxylic acid and/or ester thereof) and an approximately equimolar amount of an aromatic diamine component. Moreover, Japanese Unexamined Patent Publication No. 10-182820 discloses a method for forming a polyimide film by applying a polyimide precursor composition to a glass plate by pouring the same thereon and then heating the result (raising the temperature stepwise in the range of 80° C. to 350° C.), and also discloses using the polyimide film as an electrically conductive paste by the addition of silver powder, copper powder, carbon black, etc.

However, a semi-conductive polyimide film obtained by the above-mentioned film formation method has further room for improvement in its properties, such as electrical resistance, etc., when it is used as an intermediate transfer belt or the like in an electrophotographic system for use in color printers, color copiers, etc., which are requiring high accuracy in recent years.

DISCLOSURE OF THE INVENTION

The present invention aims, considering the above-described problems of the prior art, to provide a high-quality electrically non-conductive or electrically semi-conductive seamless (jointless) tubular polyimide film and a method for producing the same in a simple, efficient and economical manner.

The inventors of the present invention carried out intensive research so as to solve the above problems and finally found that a high-quality seamless tubular polyimide film can be obtained by rotationally molding a mixed solution substantially in a monomeric state comprising a mixture of an aromatic tetracarboxylic acid component comprising a specific amount of asymmetric aromatic tetracarboxylic acid and/or ester thereof and a specific amount of symmetric aromatic tetracarboxylic acid and/or ester thereof and an approximately equimolar amount of an aromatic diamine component, to form a tubular shape, and imidizing the tubular material by heating.

More specifically, the present invention provides the following non-conductive or semi-conductive seamless tubular polyimide films.

Item 1. A seamless tubular polyimide film, comprising polyimide having at least two aromatic tetracarboxylic acid components having a mixture of 15 to 55 mol % of asymmetric aromatic tetracarboxylic acid component and 85 to 45 mol % of symmetric aromatic tetracarboxylic acid component and at least one aromatic diamine component, the seamless tubular polyimide film having a yield stress ($\sigma_Y$) of at least 120 MPa and having a tensile strength to yield stress ratio ($\sigma_{cr}/\sigma_Y$) of at least 1.10.

Item 2. A semi-conductive seamless tubular polyimide film, wherein carbon black is dispersed in polyimide having at least two aromatic tetracarboxylic acid components having a mixture of 15 to 55 mol % of asymmetric aromatic tetracarboxylic acid component and 85 to 45 mol % of symmetric aromatic tetracarboxylic acid component and at least one aromatic diamine component, the semi-conductive seamless tubular polyimide film having a surface resistivity of $10^3$ to $10^{15}$ $\Omega$/sq.

Item 3. A semi-conductive seamless tubular polyimide film according to Item 2, wherein a log standard deviation of surface resistivity is 0.2 or smaller, a log standard deviation of volume resistivity is 0.2 or smaller, and a difference between a log surface resistivity and a log volume resistivity is 0.4 or smaller.

The invention has the above-described properties, and further encompasses the following first, second, third and fourth embodiments.

A. FIRST EMBODIMENT

The inventors of the present invention found that a high-quality electrically semi-conductive seamless tubular polyimide film can be obtained by rotational molding of an electrically semiconductive polyimide precursor composition in which a specific amount of carbon black is dispersed in a mixed solution substantially in a monomeric state having a mixture of an aromatic tetracarboxylic acid component comprising a specific amount of asymmetric aromatic tetracarboxylic acid and/or ester thereof and a specific amount of symmetric aromatic tetracarboxylic acid and/or ester thereof and an approximately equimolar amount of an aromatic diamine component, to form a tubular shape, and imidizing the tubular material by heating.

The inventors have conducted further study based on this finding and accomplished the following invention (hereinafter referred to as the "first embodiment").

The first embodiment provides the following electrically non-conductive or electrically semi-conductive seamless tubular polyimide films and production methods therefor.

Item 4. A method for producing a seamless tubular polyimide film, comprising:

rotationally molding a mixed solution substantially in a monomeric state having a mixture of an aromatic tetracarboxylic acid component comprising 15 to 55 mol % of asymmetric aromatic tetracarboxylic acid and/or ester thereof and 85 to 45 mol % of symmetric aromatic tetracarboxylic acid and/or ester thereof and an approximately equimolar amount of an aromatic diamine component, to form a tubular shape, and imidizing the tubular material by heating.

Item 5. A method for producing a semi-conductive seamless tubular polyimide film, comprising:

mixing an aromatic tetracarboxylic acid component comprising 15 to 55 mol % of asymmetric aromatic tetracarboxylic acid and/or ester thereof and 85 to 45 mol % of symmetric aromatic tetracarboxylic acid and/or ester thereof and an approximately equimolar amount of an aromatic diamine component, to form mixed solution substantially in a monomeric state, dispersing 1 to 35 parts by weight of carbon black in the mixed solution, per 100 parts by weight of a total amount of the aromatic tetracarboxylic acid component and the aromatic diamine component, to form a semi-conductive monomer mixed solution, rotationally molding the semiconductive monomer mixed solution to form a tubular shape; and imidizing the tubular material by heating.

Item 6. A semi-conductive seamless tubular polyimide film for use in an intermediate transfer belt in an electrophotographic system produced by a production method of Item 5.

B. SECOND EMBODIMENT

The inventors of the present invention carried out intensive research to solve the above problems and finally found that an electrically semi-conductive seamless tubular polyimide film with uniform electrical resistivity can be obtained by heating an aromatic tetracarboxylic acid derivative and an aromatic diamine to substantially undergo partial polycondensation, thereby yielding a mixed solution comprising an aromatic amic acid oligomer (number average molecular weight: about 1000 to about 7000); mixing electrically conductive carbon black in the mixed solution; rotationally molding the mixture; and imidizing the resultant. The inventors have conducted further study based on this finding and accomplished the following invention (hereinafter referred to as the "second embodiment").

More specifically, the second embodiment provides the following electrically semi-conductive aromatic amic acid compositions and production methods therefor, and electrically semiconductive seamless tubular polyimide films and production methods therefor.

Item 7. A semi-conductive aromatic amic acid composition comprising:

an aromatic amic acid oligomer obtained by polycondensation of at least two aromatic tetracarboxylic acid derivatives and an approximately equimolar amount of at least one aromatic diamine;

carbon black; and an organic polar solvent.

Item 8. A semi-conductive aromatic amic acid composition according to Item 7, wherein the aromatic amic acid oligomer is obtained by polycondensation of at least two aromatic tetracarboxylic dianhydrides and an approximately equimolar amount of said at least one aromatic diamine in an organic polar solvent at about 80° C. or lower.

Item 9. A semi-conductive aromatic amic acid composition according to Item 8, wherein said at least two aromatic tetracarboxylic dianhydrides are 15 to 55 mol % of asymmetric aromatic tetracarboxylic dianhydride and 85 to 45 mol % of symmetric aromatic tetracarboxylic dianhydride.

Item 10. A semi-conductive aromatic amic acid composition according to Item 7, wherein the aromatic amic acid oligomer is obtained by polycondensation of at least two aromatic tetracarboxylic acid diesters and an approximately equimolar amount of said at least one aromatic diamine in an organic polar solvent at about 90 to about 120° C.

Item 11. A semi-conductive aromatic amic acid composition according to Item 10, wherein said at least two aromatic tetracarboxylic acid diesters are 15 to 55 mol % of asymmetric aromatic tetracarboxylic acid diester and 85 to 45 mol % of symmetric aromatic tetracarboxylic acid diester.

Item 12. A semi-conductive aromatic amic acid composition according to Item 7, wherein a number average molecular weight of the aromatic amic acid oligomer is about 1000 to about 7000.

Item 13. A semi-conductive aromatic amic acid composition according to Item 7, wherein carbon black is present in an amount of about 3 to about 30 parts by weight per 100 parts by weight of a total amount of aromatic tetracarboxylic acid component and organic diamine.

Item 14. A method for producing a semi-conductive seamless tubular polyimide film, comprising:
rotationally molding a semi-conductive aromatic amic acid composition according to Item 7; followed by heating.

Item 15. A semi-conductive seamless tubular polyimide film for use in an intermediate transfer belt in an electrophotographic system produced by a production method according to Item 14.

Item 16. A method for producing a semi-conductive aromatic amic acid composition comprising:
subjecting at least two aromatic tetracarboxylic acid derivatives and an approximately equimolar amount of at least one aromatic diamine to partial condensation polymerization in an organic polar solvent, thereby yielding an aromatic amic acid oligomer solution; and
uniformly mixing electrically conductive carbon black powder with the oligomer solution.

C. THIRD EMBODIMENT

The inventors of the present invention carried out intensive research to solve the above problems and finally found that excellent dispersion stability of carbon black is achieved in a mixed solution obtained by mixing a high-molecular-weight polyimide precursor solution or a high-molecular-weight polyamideimide solution in a nylon salt monomer solution obtained by dissolving at least two aromatic tetracarboxylic acid diesters and an approximately equimolar amount of at least one aromatic diamine in an organic polar solvent. Moreover, the inventors found that a semi-conductive seamless tubular polyimide film having uniform electrical resistivity can be obtained by rotationally molding an electrically semi-conductive polyimide-based precursor composition, obtained by uniformly mixing the above mixed solution and carbon black, and imidizing the resultant. The present invention is accomplished by further applying these findings (hereinafter referred to as the "third embodiment").

More specifically, the third embodiment provides the following electrically semi-conductive polyimide-based precursor compositions and production methods therefor, and electrically semi-conductive seamless tubular polyimide-based films and production methods therefor.

Item 17. A semi-conductive polyimide-based precursor composition, wherein carbon black is uniformly dispersed in a mixed solution prepared by mixing a high-molecular-weight polyimide precursor solution or high-molecular-weight polyamideimide solution in a nylon salt monomer solution in which at least two aromatic tetracarboxylic acid diesters and an approximately equimolar amount of at least one aromatic diamine are dissolved in an organic polar solvent.

Item 18. A semi-conductive polyimide-based precursor composition according to Item 17, wherein said at least two aromatic tetracarboxylic acid diesters are 10 to 55 mol % of asymmetric aromatic tetracarboxylic acid diester and 90 to 45 mol % of symmetric aromatic tetracarboxylic acid diester.

Item 19. A semi-conductive polyimide-based precursor composition according to Item 17, wherein said at least two aromatic tetracarboxylic acid diesters are 10 to 55 mol % of asymmetric 2,3,3',4'-biphenyl tetracarboxylic acid diester and 90 to 45 mol % of symmetric 3,3',4,4'-biphenyl tetracarboxylic acid diester.

Item 20. A semi-conductive polyimide-based precursor composition according to Item 17, wherein the high-molecular-weight polyimide precursor solution is a polyamic acid solution whose number average molecular weight is 10000 or larger and the high-molecular-weight polyamideimide solution is a polyamideimide solution whose number average molecular weight is 10000 or larger.

Item 21. A semi-conductive polyimide-based precursor composition according to Item 20, wherein the polyamic acid solution whose number average molecular weight is 10000 or larger is produced by reaction of diaminodiphenyl ether and an approximately equimolar amount of biphenyltetracarboxylic dianhydride in an organic polar solvent.

Item 22. A semi-conductive polyimide-based precursor composition according to Item 20, wherein the polyamideimide solution whose number average molecular weight is 10000 or larger is produced by reaction of acid anhydride comprising trimellitic acid anhydride and benzophenone tetracarboxylic dianhydride and an approximately equimolar amount of aromatic isocyanate in an organic polar solvent.

Item 23. A method for producing a semi-conductive seamless tubular polyimide film, comprising:
rotationally molding a semi-conductive polyimide-based precursor composition according to Item 17, to form a tubular shape; and
imidizing the tubular material by heating.

Item 24. A semi-conductive seamless tubular polyimide-based film for use in an intermediate transfer belt in an electrophotographic system produced by a production method according to Item 23, whose surface resistivity is $10^7$ to $10^{14}$ Ω/sq.

Item 25. A method for producing a semi-conductive polyimide-based precursor composition, comprising:
mixing a high-molecular-weight polyimide precursor solution or high-molecular-weight polyamideimide solution in a nylon salt monomer solution in which at least two aromatic tetracarboxylic acid diesters and an approximately equimolar amount of at least one aromatic diamine are dissolved in an organic polar solvent to prepare a mixed solution, and uniformly dispersing carbon black in the mixed solution.

D. FOURTH EMBODIMENT

The inventors of the present invention carried out intensive research to solve the above problems and finally found that a high-concentration electrically semi-conductive polyimide precursor composition with excellent dispersibility of carbon black can be obtained by uniformly dispersing carbon black in an organic polar solvent to give a carbon black dispersion and dissolving aromatic tetracarboxylic acid diester and an approximately equimolar amount of aromatic diamine in the carbon black dispersion. The inventors also found that an electrically semi-conductive seamless tubular polyimide film with uniform electrical resistivity can be obtained by rotationally molding a high-concentration electrically semi-conductive polyimide precursor composition, followed by imidizing. The present invention is accomplished by further applying these findings (hereinafter referred to as "fourth embodiment").

More specifically, the fourth embodiment provides the following high-concentration electrically semi-conductive polyimide precursor compositions and production methods therefor, and electrically semi-conductive seamless tubular polyimide films using the same and production methods therefor.

Item 26. A method for producing a high-concentration semi-conductive polyimide precursor composition, comprising:
uniformly dispersing carbon black in an organic polar solvent to give a carbon black dispersion and
dissolving aromatic tetracarboxylic acid diester and an approximately equimolar amount of aromatic diamine in the carbon black dispersion.

Item 27. A method for producing a high-concentration semi-conductive polyimide precursor composition according to Item 26, wherein the aromatic tetracarboxylic acid diester is a mixture of 10 to 55 mol % of asymmetric aromatic tetracarboxylic acid diester and 90 to 45 mol % of symmetric aromatic tetracarboxylic acid diester.

Item 28. A method for producing a high-concentration semi-conductive polyimide precursor composition according to Item 26, wherein the aromatic tetracarboxylic acid diester is a mixture of 10 to 55 mol % of asymmetric 2,3,3',4'-biphenyl tetracarboxylic acid diester and 90 to 45 mol % of symmetric 3,3',4,4'-biphenyl tetracarboxylic acid diester.

Item 29. A method for producing a high-concentration semi-conductive polyimide precursor composition according to Item 26, wherein carbon black is present in an amount of 5 to 35 parts by weight per 100 parts by weight of a total amount of the aromatic tetracarboxylic acid and the aromatic diamine.

Item 30. A high-concentration semi-conductive polyimide precursor composition produced by a production method of Item 26.

Item 31. A method for producing a semi-conductive seamless tubular polyimide film, comprising:
rotationally molding a high-concentration semi-conductive polyimide precursor composition according to Item 30, to form a tubular shape; and
imidizing the tubular material by heating.

Item 32. A semi-conductive seamless tubular polyimide film for use in an intermediate transfer belt in an electrophotographic system produced by a method according to Item 31, whose surface resistivity is $10^7$ to $10^{14}$ Ω/sq.

DETAILED DESCRIPTION OF INVENTION

Hereinafter, the present invention is described in detail in "A. First Embodiment" "B. Second Embodiment" "C. Third Embodiment" and "D. Fourth Embodiment".

A. FIRST EMBODIMENT

A-1. Seamless Tubular Polyimide Film

The seamless tubular polyimide film (hereinafter sometimes referred to as "tubular PI film") of the present invention is obtained by using a specific aromatic tetracarboxylic acid component and a specific aromatic diamine component as starting materials. Specifically, the electrically non-conductive tubular PI film of the invention is obtained by using a specific aromatic tetracarboxylic acid component and a specific aromatic diamine component as starting materials, and the electrically semi-conductive tubular PI film of the invention is obtained by using, in addition to the above starting materials, a predetermined amount of carbon black (hereinafter sometimes referred to as "CB") so as to impart conductivity.

Aromatic Tetracarboxylic Acid Component

A mixture of an asymmetric aromatic tetracarboxylic acid component (at least one member selected from the group consisting of asymmetric aromatic tetracarboxylic acids and esters thereof) and a symmetric aromatic tetracarboxylic acid component (at least one member selected from symmetric aromatic tetracarboxylic acids and esters thereof) is used as the aromatic tetracarboxylic acid component starting material.

Examples of asymmetric aromatic tetracarboxylic acids include:
compounds in which four carboxyl groups are bound non-point-symmetrically to a monocyclic or polycyclic aromatic ring system (e.g., benzene nucleus, naphthalene nucleus, biphenyl nucleus, and anthracene nucleus); and
compounds in which four carboxyl groups are bound non-point-symmetrically to two monocyclic aromatic rings (e.g., benzene nuclei) linked by a group such as —CO—, —CH$_2$— or —SO$_2$—, or by a single bond.

Specific examples of asymmetric aromatic tetracarboxylic acids include 1,2,3,4-benzenetetracarboxylic acid, 1,2,6,7-naphthalenetetracarboxylic acid, 2,3,3',4'-biphenyltetracarboxylic acid, 2,3,3',4'-benzophenonetetracarboxylic acid, 2,3,3',4'-diphenyl ether tetracarboxylic acid, 2,3,3',4'-diphenylmethanetetracarboxylic acid, and 2,3,3',4'-diphenylsulfonetetracarboxylic acid.

Examples of asymmetric aromatic tetracarboxylic acid esters for use in the present invention include diesters of such asymmetric aromatic tetracarboxylic acids (i.e., half esterified). Specific examples thereof include compounds in which two of the four carboxyl groups of the asymmetric aromatic tetracarboxylic acid are esterified with one of each pair of adjacent carboxyl groups on an aromatic ring being esterified.

Examples of the two esters of such asymmetric aromatic tetracarboxylic acid diesters include di(lower alkyl)esters, and preferably di(C$_{1-3}$ alkyl)esters, such as dimethyl esters, diethyl esters, and dipropyl esters (particularly, dimethyl esters).

Among such asymmetric aromatic tetracarboxylic acid diesters, 2,3,3',4'-biphenyltetracarboxylic acid dimethyl esters and 2,3,3',4'-biphenyltetracarboxylic acid diethyl esters are preferable, with 2,3,3',4'-biphenyltetracarboxylic acid dimethyl esters being particularly preferable.

Asymmetric aromatic tetracarboxylic acid diesters as above are commercially available, and can also be produced by known methods. They can be easily produced, for example, by a known method of reacting the corresponding asymmetric aromatic tetracarboxylic dianhydride with the corresponding alcohol (e.g., lower alcohol, preferably $C_{1-3}$ alcohol) at a molar ratio of 1:2. By such a method, the acid anhydride, which is a starting material, reacts with the alcohol and thereby undergoes ring opening, providing a diester (half esterified) having an ester group and a carboxyl group on respective adjacent carbons on an aromatic ring.

Examples of symmetric aromatic tetracarboxylic acids include:

compounds in which four carboxyl groups are bound point-symmetrically to a monocyclic or polycyclic aromatic ring system (e.g., benzene nucleus, naphthalene nucleus, biphenyl nucleus, and anthracene nucleus); and compounds in which four carboxyl groups are bound point-symmetrically to two monocyclic aromatic rings (e.g., benzene nuclei) linked by a group such as —CO—, —O—, —CH$_2$— or —SO$_2$—, or by a single bond.

Specific examples of symmetric aromatic tetracarboxylic acids include 1,2,4,5-benzenetetracarboxylic acid, 2,3,6,7-naphthalenetetracarboxylic acid, 3,3',4,4'-biphenyltetracarboxylic acid, 3,3',4,4'-benzophenone tetracarboxylic acid, 3,3',4,4'-diphenyl ether tetracarboxylic acid, 3,3',4,4'-diphenylmethanetetracarboxylic acid, and 3,3',4,4'-diphenylsulfonetetracarboxylic acid.

Examples of symmetric aromatic tetracarboxylic acid esters for use in the present invention include diesters of such symmetric aromatic tetracarboxylic acids (i.e., half esterified). Specific examples thereof include compounds in which two of the four carboxyl groups of the symmetric aromatic tetracarboxylic acid are esterified with one of each pair of adjacent carboxyl groups on an aromatic ring being esterified.

Examples of the two esters of such symmetric aromatic tetracarboxylic acid diesters include di(lower alkyl)esters, and preferably $C_{1-3}$ alkyl esters, such as dimethyl esters, diethyl esters, and dipropyl esters (particularly, dimethyl esters).

Among such symmetric aromatic tetracarboxylic acid diesters, 3,3',4,4'-biphenyltetracarboxylic acid dimethyl esters, 3,3',4,4'-biphenyltetracarboxylic acid diethyl esters, and 2,3,5,6-benzenetetracarboxylic acid dimethyl esters are preferable, with 3,3',4,4'-biphenyltetracarboxylic acid dimethyl esters being particularly preferable.

Symmetric aromatic tetracarboxylic acid diesters as above are commercially available, and can also be produced by known methods. They can be easily produced, for example, by reacting the corresponding symmetric aromatic tetracarboxylic dianhydride with the corresponding alcohol (e.g., lower alcohol, preferably $C_{1-3}$ alcohol) at a molar ratio of 1:2. By such a method, the acid anhydride, which is a starting material, reacts with the alcohol and thereby undergoes ring opening, providing a diester (half esterified) having an ester group and a carboxyl group on respective adjacent carbons on an aromatic ring.

The mixing ratio for asymmetric and symmetric aromatic tetracarboxylic acids and/or esters thereof is specified such that the proportion of asymmetric aromatic tetracarboxylic acid(s) and/or ester(s) thereof is about 15 to about 55 mol % (and preferably about 20 to about 50 mol %) and the proportion of symmetric aromatic tetracarboxylic acid(s) or ester(s) thereof is about 85 to about 45 mol % (and preferably about 80 to about 50 mol %). It is particularly preferable to use about 20 to about 50 mol % of asymmetric aromatic tetracarboxylic acid diester(s) and about 80 to about 50 mol % of symmetric aromatic tetracarboxylic acid diester(s).

The combined use of such symmetric and asymmetric aromatic tetracarboxylic acid components is essential for the following reasons. Use of only symmetric aromatic tetracarboxylic acids and/or esters thereof induces crystallization of a polyimide film and thereby causes powderization of the film during heat treatment, which thus cannot achieve film formation. Although use of only asymmetric aromatic tetracarboxylic acids and/or esters thereof achieves the formation of a seamless tubular PI film, such an obtained film has inferior yield stress and elastic modulus, and, when used as a rotational belt, it suffers from problems such as low driving responsiveness and early elongation of the belt.

In contrast, the combined use of aromatic tetracarboxylic acids and/or esters thereof at a mixing ratio as above achieves extremely high film-forming capability (formability), and provides a semi-conductive seamless tubular PI film having high yield stress and elastic modulus.

Further, the addition of an asymmetric aromatic tetracarboxylic acid and/or ester thereof presumably causes a polyamic acid molecule to bend, thereby imparting flexibility.

The effects of the coexistence of asymmetric and symmetric aromatic tetracarboxylic acids and/or esters thereof are most apparent when they are mixed at a ratio as specified above.

Aromatic Diamine Component

Examples of aromatic diamine components include compounds having two amino groups on a single aromatic ring (e.g., benzene nucleus), and compounds having two amino groups in which two or more aromatic rings (e.g., benzene nuclei) are linked by a group such as —O—, —S—, —CO—, —CH$_2$—, —SO— or —SO$_2$—, or by a single bond. Specific examples thereof include p-phenylenediamine, o-phenylenediamine, m-phenylenediamine, 4,4'-diaminodiphenyl ether, 4,4'-diaminodiphenyl thioether, 4,4'-diaminodiphenylcarbonyl, 4,4'-diaminodiphenylmethane, and 1,4-bis(4-aminophenoxy)benzene. Among these, 4,4'-diaminodiphenyl ether is particularly preferable. Use of such an aromatic diamine component allows the reaction to proceed more smoothly, and provides a film having greater toughness and higher heat resistance.

Organic Polar Solvent

An aprotic organic polar solvent is preferable as an organic polar solvent used for a substantially monomeric mixed solution. Examples thereof include N-methyl-2-pyrrolidone (hereafter referred to as "NMP"), N,N-dimethylformamide, N,N-diethylformamide, N,N-dimethylacetamide, dimethylsulfoxide, hexamethylphosphoramide, and 1,3-dimethyl-2-imidazolidinone. Such solvents may be used singly, and a mixed solvent of two or more such solvents can also be used. NMP is particularly preferable. The amount of organic polar solvent is set to about 65 to about 300 parts by weight (preferably about 80 to about 230 parts by weight, and more preferably about 100 to about 200 parts by weight) per 100 parts by weight of the total amount of the aromatic tetracarboxylic acid component and the aromatic diamine component (starting materials).

Carbon Black (CB)

In producing the semi-conductive tubular PI film of the invention, CB powder is used in addition to the above-described components for the purpose of imparting electrical resistance characteristics. The reason for using CB powder is that, compared with other known conducting materials such as metals and metal oxides, CB exhibits excellent dispersibility as well as excellent stability (change over time after mixing and dispersion) in a prepared monomer mixed solution, and does not have any adverse effects on polycondensation.

There are various kinds of CB powder with various properties (electrical resistance, volatile content, specific surface area, particle diameter, pH value, DBP oil absorption, etc.) depending on the source (natural gas, acetylene gas, coal tar, etc.) and production conditions (combustion conditions). CB powder having a developed structure with a high conductivity index (typically, CB powder produced by using acetylene gas) is capable of providing a desired electrical resistance even when a comparatively small amount thereof is added, however, its dispersibility upon mixing is inferior. With respect to oxidized CB powder having low pH and CB powder with high volatile content, although their conductivity indices are not high and a relatively large amount must be added to achieve a desired electrical resistance, their dispersibility and storage stability are excellent, and a belt having uniform electrical resistance can be obtained more easily therefrom.

Such conductive CB powder usually has a mean particle diameter of about 15 to about 65 nm. When used, for example, for electrophotographic intermediate transfer belts for color printers, color copying machines or the like, CB powder having a mean particle diameter of about 20 to about 40 nm is particularly preferable.

Examples thereof include channel black and oxidized furnace black. Specific examples include Special Black 4 (pH 3, volatile content 14%, particle diameter 25 nm) and Special Black 5 (pH 3, volatile content 15%, particle diameter 20 nm), manufactured by Degusa Corporation.

CB powder is added preferably in an amount of about 1 to about 35 parts by weight (and preferably about 5 to about 25 parts by weight) per 100 parts by weight of the total amount of the aromatic tetracarboxylic acid component and the aromatic diamine component, which are starting materials for a mixed solution in a substantially monomeric state.

The purpose of using CB powder in such an amount is to provide the film with volume resistivity ($\Omega \cdot cm$) (VR) and surface resistivity ($\Omega/sq$) (SR) in a semi-conductive range. The lower limit is set at not less than about 1 part by weight because at least this amount is necessary to obtain sufficient conductivity. The upper limit is set at not more than about 35 parts by weight for the purpose of lowering the resistance and maintaining formability to thereby prevent the film properties from deteriorating.

Preparation of Monomer Mixed Solution

A film-formation mixed solution in a substantially monomeric state (hereinafter sometimes referred as "monomer mixed solution") is prepared by mixing specific amounts of aromatic tetracarboxylic acid component, aromatic diamine component, and organic polar solvent. The difference between the non-conductive tubular PI film and semi-conductive tubular PI film of the present invention is whether CB powder is contained, and the monomer mixed solutions, which are staring materials therefor, are prepared under the same conditions in both cases. The preparation procedure is not specifically limited. This is because, unlike when highly reactive aromatic tetracarboxylic dianhydrides are used, the aromatic tetracarboxylic acid components for use in the present invention do not substantially react with the diamine components at low temperatures (e.g., 30 to 40° C. or less), which is an advantage in the preparation of a monomer mixed solution.

The monomer mixed solution is prepared by mixing and dissolving, in an organic polar solvent, an aromatic tetracarboxylic acid component as above and an aromatic diamine component as above at such a mixing ratio that they are in approximately equimolar amounts. These components are monomers, and are thus easily dissolvable in an organic polar solvent. Accordingly, they can be uniformly dissolved at a high concentration, and the obtained solution can be maintained in a substantially monomeric state. The present invention uses such a monomer mixed solution as a starting material.

Approximately equimolar amounts herein provide a mixing ratio at which the polycondensation reaction of an aromatic tetracarboxylic acid component with an aromatic diamine component smoothly proceeds and a desired high-molecular-weight polyimide can be obtained. A substantially monomeric state herein means that almost all the components in the mixed solution are in a monomeric state. The monomer mixed solution may contain a small amount of low-molecular-weight polycondensate such as oligomer, within a range that the present invention is not adversely affected.

The amount of organic polar solvent is set to about 65 to about 300 parts by weight (preferably about 80 to about 230 parts by weight, and more preferably about 100 to about 200 parts by weight) per 100 parts by weight of the total amount of the aromatic tetracarboxylic acid component and the aromatic diamine component (starting materials). Because the monomers can be easily dissolved in an organic polar solvent as above, a mixed solution in a substantially monomeric state thus produced provides the advantage that the amount of solvent can be minimized.

Examples of methods for preparing a monomer mixed solution are described hereinafter.

According to a first example, symmetric and asymmetric aromatic tetracarboxylic acid components in mol % as specified above are first mixed and dissolved in an organic polar solvent. An aromatic diamine component approximately equimolar to the total of these aromatic tetracarboxylic acid components is then added to this solution while stirring and uniformly dissolved therein, giving a film-formation monomer mixed solution.

According to a second example, a solution of a specified amount of symmetric aromatic tetracarboxylic acid component and an approximately equimolar aromatic diamine component, and a solution of a specified amount of asymmetric aromatic tetracarboxylic acid component and an approximately equimolar aromatic diamine component are prepared separately. The solutions are then mixed at such a ratio that the two aromatic tetracarboxylic acid components are each in mol % as specified above, giving a film-formation monomer mixed solution.

According to a third example, specified amounts of symmetric and asymmetric aromatic tetracarboxylic acid components are added to an organic polar solvent simultaneously with an aromatic diamine component, providing a uniform monomer mixed solution.

The monomer mixed solution for use in the invention may be a high-concentration solution having a nonvolatile content of about 45% by weight (particularly about 30 to about 45% by weight), unlike conventional polyamic acid solutions having a maximum nonvolatile content of about 25% by weight. "Nonvolatile content" as used herein means a content measured by the method described in the Examples. Use of such a high-concentration monomer mixed solution leads to a speedy polymerization reaction, thereby enabling the reduction of film formation time. Further, a thick film can be readily produced, and, because only a small amount of solvent is required, costs can be reduced and the evaporative removal of solvent can be simplified.

Additives such as imidazole compounds (e.g., 2-methylimidazole, 1,2-dimethylimidazole, 2-methyl-4-methylimidazole, 2-ethyl-4-ethylimidazole, and 2-phenylimidazole) and surfactants (e.g., fluorosurfactants) can be added to the monomer mixed solution, within ranges that the effects of the present invention are not adversely affected.

A semi-conductive monomer mixed solution obtained by dispersing carbon black in a monomer mixed solution is used in the production of a semi-conductive tubular PI film. The method for mixing CB powder in a monomer mixed solution is not limited, and stirring or like known method can be employed. A ball mill is preferably used for stirring, whereby a film-formation semi-conductive monomer mixed solution having CB uniformly dispersed therein can be obtained.

Carbon black is used, as described above, in an amount of 1 to 35 parts by weight, and preferably 5 to 25 parts by weight, per 100 parts by weight of the total amount of the aromatic tetracarboxylic acid component and the aromatic diamine component.

A-2, Method for Producing Seamless Tubular Polyimide Film

Hereinafter, a process of forming a tubular PI film using a monomer mixed solution or semi-conductive monomer mixed solution as prepared above is described. Although the below-described process uses a monomer mixed solution, a process using a semi-conductive monomer mixed solution may be performed in the same manner.

Rotational molding using a rotating drum is employed for this formation process. First, a monomer mixed solution is introduced into a rotating drum and uniformly cast over the entire inner surface.

The method for introduction/casting may be such that, for example, a monomer mixed solution in an amount sufficient to provide the desired final film thickness is introduced into a rotating drum while stationary, and the rotational speed is then gradually raised to an extent that centrifugal force is generated, so that the solution is cast uniformly over the entire inner surface by the centrifugal force. Alternatively, introduction/casting may be performed without using centrifugal force. According to one possible method, a horizontally elongated slit-like nozzle is arranged inside a rotating drum, and, while slowly rotating the drum, the nozzle is rotated (at a speed greater than the drum rotational speed). The film-formation monomer mixed solution is uniformly ejected from the nozzle over the entire inner surface of the drum. The drum is mounted on rotating rollers, and is rotated indirectly by the rotation of the rollers.

A far-infrared radiation heater or the like is arranged around the drum, and heating is carried out indirectly by such an external heat source. The size of the drum depends on the size of the desired semi-conductive tubular PI film.

Heating is first carried out so that the inner surface of the drum is gradually heated to about 100 to about 190° C., and preferably to about 110 to about 130° C. (first heating step). The rate of heating is about 1 to about 2° C./min. This temperature is maintained for 30 to 120 minutes, so that approximately half or more of the solvent is volatized, and a self-supporting tubular film is thereby formed. Although imidization requires a temperature of 280° C. or higher, if heating is carried out at such a high temperature from the beginning, the polyimide becomes highly crystalline, which adversely affects the CB dispersion state, further causing problems such as a film thus formed lacking toughness. Therefore, as a first heating step, the temperature is raised not higher than about 190° C., and the polycondensation reaction is completed at such a temperature, so as to obtain a tough tubular PI film.

After this step, heating to complete imidization is then carried out as a second heating step at about 280 to about 400° C. (and preferably about 300 to about 380° C.). In this step, the temperature is also preferably raised from the temperature of the first heating step gradually, rather than rapidly.

The second heating step may be performed while the seamless tubular film is adhered to the inner surface of the rotating drum, or alternatively, it is also possible to separate and remove the seamless tubular film from the rotating drum after the first heating step, and separately heat the film to 280 to 400° C. by a heating means for imidization. Such imidization usually takes about 2 to 3 hours. Accordingly, the entire process of the first and second heating steps usually takes about 4 to about 7 hours in total.

A non-conductive (or semi-conductive) PI film of the invention is thus produced. The film usually has a thickness of about 30 to about 200 μm, although not limited thereto, and preferably about 60 to about 120 μm. When used as an electrophotographic intermediate transfer belt, a thickness of about 75 to about 100 μm is particularly preferable.

With respect to a semi-conductive PI film, the semiconductivity thereof is an electrical resistance property determined by the volume resistivity (Ω·cm) (VR) and surface resistivity (Ω/sq) (SR). Such a property is due to CB powder having been mixed and dispersed therein. Basically, the resistivity can be freely varied by varying the amount of CB powder to be mixed. The film of the invention may have, for example, a resistivity within the range of $VR:10^2$ to $10^{14}$ and $SR:10^3$ to $10^{15}$, and preferably $VR:10^6$ to $10^{13}$ and $SR:10^7$ to $10^{14}$. Such a resistivity range can be easily achieved by using CB powder in an amount as specified above. The CB content of the film of the invention is usually about 5 to about 25% by weight, and preferably about 8 to about 20% by weight.

The semi-conductive PI film of the invention has extremely uniform electrical resistivity. More specifically, the semi-conductive PI film of the invention is characterized by small variation in log surface resistivity SR and log volume resistivity VR; that is, their log standard deviations of all the measurement points of the film are each 0.2 or less, and preferably 0.15 or less. The film of the invention is also characterized in that the difference in surface resistivities (in terms of log) between its front and rear surfaces is as small as 0.4 or less, and preferably 0.2 or less. The film of the invention is further characterized in that the value obtained by subtracting Log VR (log volume resistivity) from Log SR (log surface resistivity) can be maintained at a level as high as 1.0 to 3.0, and preferably 1.5 to 3.0.

The semi-conductive PI film of the invention is applicable to a wide range of uses due to its excellent electrical resistance properties and other characteristics. Examples of important applications that require charging characteristics include electrophotographic intermediate transfer belts for color printers, color copying machines, or the like. Such a belt requires a semiconductivity (resistivity) of, for example, $VR\ 10^9$ to $10^{12}$ and $SR\ 10^{10}$ to $10^{13}$, and accordingly, the semi-conductive seamless tubular PI-based film of the invention is suitable.

The non-conductive or semi-conductive PI film of the invention is highly efficient as a belt, and has high yield stress ($\sigma_Y$) and high tensile strength ($\sigma_{cr}$). The yield stress ($\sigma_Y$) is 120 Mpa or more, particularly 120 to 160 Mpa, and the ratio of tensile strength to yield stress ($\sigma_{cr}/\sigma_Y$) is 1.10 or more, particularly about 1.10 to about 1.35.

B. SECOND EMBODIMENT

The electrically semi-conductive seamless tubular polyimide film (hereinafter sometimes referred to as "semi-conductive tubular PI film") of the present invention is produced by rotationally molding a semi-conductive aromatic amic acid composition containing an aromatic amic acid oligomer, conductive carbon black (hereinafter sometimes referred to as "CB") and an organic polar solvent, and then imidizing the resultant.

B-1. Semi-Conductive Aromatic Amic Acid Composition

The semi-conductive aromatic amic acid composition of the present invention is prepared by first subjecting approximately equimolar amounts of 1) at least two aromatic tetracarboxylic acid derivatives and 2) at least one aromatic diamine to a partial polycondensation reaction in an organic polar solvent to obtain an aromatic amic acid oligomer (an aromatic amic acid having a number average molecular weight of about 1000 to about 7000) solution, and then uniformly mixing conductive carbon black powder with the aromatic amic acid oligomer solution.

(1) Aromatic Tetracarboxylic Acid Derivative

A mixture of at least one asymmetric aromatic tetracarboxylic acid derivative and at least one symmetric aromatic tetracarboxylic acid derivative are used as said at least two aromatic tetracarboxylic acid derivative starting materials.

Asymmetric Aromatic Tetracarboxylic Acid Derivative

Examples of asymmetric aromatic tetracarboxylic acid derivatives herein include asymmetric aromatic tetracarboxylic dianhydrides and asymmetric aromatic tetracarboxylic acid diesters (i.e., half esterified).

Examples of asymmetric aromatic tetracarboxylic acids include:

compounds in which four carboxyl groups are bound non-point-symmetrically to a monocyclic or polycyclic aromatic ring system (e.g., benzene nucleus, naphthalene nucleus, biphenyl nucleus, and anthracene nucleus); and compounds in which four carboxyl groups are bound non-point-symmetrically to two monocyclic aromatic rings (e.g., benzene nuclei) linked by a group such as —CO—, —CH$_2$— or —SO$_2$—, or by a single bond.

Specific examples of asymmetric aromatic tetracarboxylic acids include 1,2,3,4-benzenetetracarboxylic acid, 1,2,6,7-naphthalenetetracarboxylic acid, 2,3,3',4'-biphenyltetracarboxylic acid, 2,3,3',4'-benzophenonetetracarboxylic acid, 2,3,3',4'-diphenyl ether tetracarboxylic acid, 2,3,3',4'-diphenylmethanetetracarboxylic acid, and 2,3,3',4'-diphenylsulfonetetracarboxylic acid.

Examples of asymmetric aromatic tetracarboxylic dianhydrides herein include dianhydrides of such asymmetric aromatic tetracarboxylic acids. Specific examples thereof include compounds in which pairs of adjacent carboxyl groups on one or more aromatic rings, in asymmetric aromatic tetracarboxylic acids as above, form two acid anhydrides. Among these, 2,3,3',4'-biphenyltetracarboxylic dianhydride and 1,2,6,7-naphthalenetetracarboxylic dianhydride are preferable, with 2,3,3',4'-biphenyltetracarboxylic dianhydride being particularly preferable.

Examples of asymmetric aromatic tetracarboxylic acid diesters (i.e., half esterified) for use in the present invention include diesters of such asymmetric aromatic tetracarboxylic acids (i.e., half esterified). Specific examples thereof include compounds in which two of the four carboxyl groups of the asymmetric aromatic tetracarboxylic acid are esterified with one of each pair of adjacent carboxyl groups on an aromatic ring being esterified.

Examples of the two esters of such asymmetric aromatic tetracarboxylic acid diesters include di(lower alkyl)esters, and preferably di($C_{1-3}$ alkyl)esters, such as dimethyl esters, diethyl esters, and dipropyl esters (particularly, dimethyl esters).

Among such symmetric aromatic tetracarboxylic acid diesters, 2,3,3',4'-biphenyltetracarboxylic acid dimethyl esters and 2,3,3',4'-biphenyltetracarboxylic acid diethyl esters are preferable, with 2,3,3',4'-biphenyltetracarboxylic acid dimethyl esters being particularly preferable.

Asymmetric aromatic tetracarboxylic acid diesters as above are commercially available, and can also be produced by known methods. They can be easily produced, for example, by a known method of reacting the corresponding asymmetric aromatic tetracarboxylic dianhydride with the corresponding alcohol (e.g., lower alcohol, preferably $C_{1-3}$ alcohol) at a molar ratio of 1:2. By such a method, the acid anhydride, which is a starting material, reacts with the alcohol and thereby undergoes ring opening, providing a diester (half esterified) having an ester group and a carboxyl group on respective adjacent carbons on an aromatic ring.

Symmetric Aromatic Tetracarboxylic Acid Derivative

Symmetric aromatic tetracarboxylic acid derivatives herein include symmetric aromatic tetracarboxylic dianhydrides and symmetric aromatic tetracarboxylic acid diesters (i.e., half esterified).

Examples of symmetric aromatic tetracarboxylic acids include:

compounds in which four carboxyl groups are bound point-symmetrically to a monocyclic or polycyclic aromatic ring system (e.g., benzene nucleus, naphthalene nucleus, biphenyl nucleus, and anthracene nucleus); and compounds in which four carboxyl groups are bound point-symmetrically to two monocyclic aromatic rings (e.g., benzene nuclei) linked by a group such as —CO—, —O—, —CH$_2$— or —SO$_2$—, or by a single bond.

Specific examples of symmetric aromatic tetracarboxylic acids include 1,2,4,5-benzenetetracarboxylic acid, 2,3,6,7-naphthalenetetracarboxylic acid, 3,3',4,4'-biphenyltetracarboxylic acid, 3,3',4,4'-benzophenone tetracarboxylic acid, 3,3',4,4'-diphenyl ether tetracarboxylic acid, 3,3',4,4'-diphenylmethanetetracarboxylic acid, and 3,3',4,4'-diphenylsulfonetetracarboxylic acid.

Examples of symmetric aromatic tetracarboxylic dianhydrides for use in the present invention include dianhydrides of such symmetric aromatic tetracarboxylic acids. Specific examples thereof include compounds in which pairs of adjacent carboxyl groups, in symmetric aromatic tetracarboxylic acids as above, form two acid anhydride groups. Among these, 1,2,4,5-benzenetetracarboxylic dianhydride and 3,3',4,4'-biphenyltetracarboxylic dianhydride are preferable, with 3,3',4,4'-biphenyltetracarboxylic dianhydride being particularly preferable. This is because these dianhydrides have beneficial effects on the resulting film strength and the like.

Examples of symmetric aromatic tetracarboxylic acid diesters (i.e., half esterified) for use in the present invention include diesters of such asymmetric aromatic tetracarboxylic acids as above (i.e., half esterified). Specific examples thereof include compounds in which two of the four carboxyl groups of the symmetric aromatic tetracarboxylic acid are esterified with one of each pair of adjacent carboxyl groups on an aromatic ring being esterified.

Examples of the two esters of such symmetric aromatic tetracarboxylic acid diesters include di(lower alkyl)esters, and preferably $C_{1-3}$ alkyl esters, such as dimethyl esters, diethyl esters, and dipropyl esters (particularly, dimethyl esters).

Among such symmetric aromatic tetracarboxylic acid diesters, 3,3',4,4'-biphenyltetracarboxylic acid dimethyl esters, 3,3',4,4'-biphenyltetracarboxylic acid diethyl esters, and 2,3,5,6-benzenetetracarboxylic acid dimethyl esters are preferable, with 3,3',4,4'-biphenyltetracarboxylic acid dimethyl esters being particularly preferable.

Symmetric aromatic tetracarboxylic acid diesters as above are commercially available, and can also be produced by known methods. They can be easily produced, for example, by reacting the corresponding symmetric aromatic tetracarboxylic dianhydride with the corresponding alcohol (e.g., lower alcohol, preferably $C_{1-3}$ alcohol) at a molar ratio of 1:2. By such a method, the acid anhydride, which is a starting material, reacts with the alcohol and thereby undergoes ring opening, providing a diester (half esterified) having an ester group and a carboxyl group on respective adjacent carbons on an aromatic ring.

Mixing Ratio

The mixing ratio for asymmetric and symmetric aromatic tetracarboxylic acid derivatives is specified such that the proportion of asymmetric aromatic tetracarboxylic acid derivative(s) is about 10 to about 55 mol % (preferably about 15 to about 55 mol %, and more preferably about 20 to about 50 mol %) and the proportion of symmetric aromatic tetracarboxylic acid derivative(s) is about 90 to about 45 mol % (preferably about 80 to about 45 mol %, and more preferably about 80 to about 50 mol %). It is particularly preferable to use about 20 to about 50 mol % of asymmetric aromatic tetracarboxylic dianhydride(s) and about 80 to about 50 mol % of symmetric aromatic tetracarboxylic dianhydride(s).

The combined use of such symmetric and asymmetric aromatic tetracarboxylic acid derivatives is essential for the following reasons. Use of only symmetric aromatic tetracarboxylic acid derivatives induces crystallization of a polyimide film and thereby causes powderization of the film during heat treatment, which thus cannot achieve film formation. Although use of only asymmetric aromatic tetracarboxylic acid derivatives achieves the formation of a seamless tubular PI film, such an obtained film has inferior yield stress and elastic modulus, and, when used as a rotational belt, it suffers from problems such as low driving responsiveness and early elongation of the belt.

In contrast, the combined use of aromatic tetracarboxylic acid derivatives at a mixing ratio as above achieves extremely high film-forming capability (formability), and provides a semi-conductive seamless tubular PI film having high yield stress and elastic modulus.

Further, the addition of an asymmetric aromatic tetracarboxylic acid derivative presumably causes a polyamic acid molecule to bend, thereby imparting flexibility.

The effects of the coexistence of such asymmetric and symmetric aromatic tetracarboxylic acid derivatives are most apparent when they are mixed at a ratio as specified above.

(2) Aromatic Diamine

Examples of aromatic diamines include compounds having two amino groups on a single aromatic ring (e.g., benzene nucleus), and compounds having two amino groups in which two or more aromatic rings (e.g., benzene nuclei) are linked by a group such as —O—, —S—, —CO—, —CH$_2$—, —SO— or —SO$_2$—, or by a single bond. Specific examples thereof include p-phenylenediamine, o-phenylenediamine, m-phenylenediamine, 4,4'-diaminodiphenyl ether, 4,4'-diaminodiphenyl thioether, 4,4'-diaminodiphenylcarbonyl, 4,4'-diaminodiphenylmethane, and 1,4-bis(4-aminophenoxy)benzene. Among these, 4,4'-diaminodiphenyl ether is particularly preferable. Use of such an aromatic diamine allows the reaction to proceed more smoothly, and provides a film having greater toughness and higher heat resistance.

(3) Organic Polar Solvent

An aprotic organic polar solvent is preferable as an organic polar solvent. Examples thereof include N-methyl-2-pyrrolidone (hereafter referred to as "NMP"), N,N-dimethylformamide, N,N-diethylformamide, N,N-dimethylacetamide, dimethylsulfoxide, hexamethylphosphoramide, and 1,3-dimethyl-2-imidazolidinone. Such solvents may be used singly, and a mixed solvent of two or more such solvents can also be used. NMP is particularly preferable. The amount of organic polar solvent is set to about 100 to about 300 parts by weight (and preferably about 150 to about 250 parts by weight) per 100 parts by weight of the total amount of the aromatic tetracarboxylic acid derivatives and the aromatic diamine(s) (starting materials). An aromatic amic acid oligomer thus produced can relatively easily dissolve in an organic polar solvent as above, and accordingly is advantageous in that the amount of solvent used can be minimized.

(4) Preparation of Aromatic Amic Acid Oligomer Solution

Examples of methods for preparing an aromatic amic acid oligomer (with a number average molecular weight of about 1000 to about 7000) by a partial polycondensation reaction of at least two aromatic tetracarboxylic acid derivatives with at least one organic diamine in an organic polar solvent are described hereinafter.

According to a first example of an aromatic amic acid oligomer preparation method, an aromatic amic acid oligomer (with a number average molecular weight of about 1000 to about 7000) is prepared by a polycondensation reaction of at least two aromatic tetracarboxylic dianhydrides with an approximately equimolar amount of at least one aromatic diamine in an organic polar solvent at 80° C. or less.

Specifically, a mixture comprising about 15 to about 55 mol % (and preferably about 20 to about 50 mol %) of asymmetric aromatic tetracarboxylic dianhydride(s) and about 85 to about 45 mol % (and preferably about 80 to about 50 mol %) of symmetric aromatic tetracarboxylic dianhydride(s) is subjected to a polycondensation reaction. Usable organic polar solvents are those as described above. NMP is particularly preferable.

The purpose of limiting the temperature of the reaction to about 80° C. or less is to suppress imidization during the formation of the aromatic amic acid oligomer. A reaction temperature of 30 to 70° C. is more preferable. A reaction temperature of more than 80° C. is not desirable in that polyimide is likely to be formed due to imidization. The reaction time depends on the reaction temperature etc., and is usually about a few hours to about 72 hours.

The molecular weight of the aromatic amic acid oligomer may be controlled by any known method. The control may be suitably carried out, for example, by a method in which polymerization is carried out at an aromatic tetracarboxylic acid derivative/aromatic diamine molar ratio of 0.5 to 0.95 to thereby obtain an aromatic amic acid oligomer having a predetermined molecular weight, and optionally further aromatic tetracarboxylic acid derivative(s) is then added thereto so that the aromatic tetracarboxylic acid derivative/aromatic diamine becomes equimolar (see Japanese Examined Patent Publication No. 1989-22290); or a method in which a reaction is carried out at an approximately equimolar aromatic tetracarboxylic acid derivative/aromatic diamine ratio, in the presence of a predetermined amount of compound that suppresses molecular weight increase, such as water (see Japanese Patent No. 1990-3820).

According to a second example of an aromatic amic acid oligomer preparation method, an aromatic amic acid oligomer (with a number average molecular weight of about 1000 to about 7000) is produced by a polycondensation reaction of two or more aromatic tetracarboxylic acid diesters with an equimolar amount of at least one aromatic diamine in an organic polar solvent at about 90 to about 120° C.

Specifically, a mixture comprising about 15 to about 55 mol % (and preferably about 20 to about 50 mol %) of asymmetric aromatic tetracarboxylic acid diester(s) and about 85 to about 45 mol % (and preferably about 80 to about 50 mol %) of symmetric aromatic tetracarboxylic acid diester(s) is subjected to a polycondensatoin reaction. Usable organic polar solvents are those as described above. NMP is particularly preferable.

The temperature and time of the reaction are intimately related to preparing an aromatic amic acid oligomer with a desired molecular weight. The temperature of heating is usually about 90 to about 120° C. When the reaction temperature is in a high-temperature range, the reaction time is preferably short in order to reduce the yield of imide (imidization proportion) and suppress molecular weight increase. Heat treatment can be carried out by gradually heating to a predetermined temperature, performing the reaction at a predetermined temperature for about 1 to about 3 hours, and then cooling. For example, the mixture may be heated to about 90 to about 120° C. for about 1 to about 4 hours, allowed to react at the same temperature for about 30 minutes to about 2 hours, and then cooled.

In the above first and second preparation methods, approximately equimolar amounts provide a mixing ratio at which an aromatic amic acid having a predetermined approximately oligomeric molecular weight, whereby a desired semi-conductive tubular PI film can be obtained. Heating may be performed (at, for example, about 40 to about 70° C.), if necessary, for such uniform dissolution of the components in an organic polar solvent.

By such a first or second preparation method, an aromatic amic acid oligomer solution is prepared. The number average molecular weight (Mn) thereof is controlled to be about 1000 to about 7000 (preferably about 3000 to about 7000). The reason for specifying such a range is that a solution having a number average molecular weight of 1000 or less (i.e., monomer, dimer, etc.) does not achieve the desired effects on electroconductive properties, while a solution having a number average molecular weight of 7000 or more is not usable because, for example, the solution gelates due to the extreme lowering of oligomer solubility (see, e.g., Comparative Example B-1). The number average molecular weight can be measured by, for example, the method described in the Examples.

The aromatic amic acid oligomer has a controlled number average molecular weight (Mn) of about 1000 to about 7000, and the ratio (Mw/Mn) of the weight average molecular weight (Mw) to the number average molecular weight (Mn) is 2 or less.

An aromatic amic acid oligomer solution produced by such a heat treatment has an aromatic amic acid oligomer as the main component, which may have further partially reacted and imidized, etc. The yield of imide (imidization proportion) in the aromatic amic acid oligomer is preferably 30% or less, more preferably 25% or less, and particularly preferably 20% or less. The yield of generated by-product imide (imidization proportion) can be measured by, for example, the method described in the Examples.

Further, the nonvolatile content of the aromatic amic acid oligomer solution may be controlled to be as high as about 30 to about 45% by weight. Control to such a high nonvolatile content is possible because the solution is oligomeric in which the molecular weight has not been increased and thus is easily dissolved in a solvent. Accordingly, a thick film can be readily produced, and, because only a small amount of solvent is required, costs can be reduced and the evaporative removal of solvent can be simplified. "Nonvolatile content" as used herein means a content measured by the method described in the Example B-1.

(5) Preparation of Semi-Conductive Aromatic Amic Acid Composition

An aromatic amic acid oligomer solution thus obtained is uniformly mixed with conductive CB powder, providing a semi-conductive aromatic amic acid composition.

The reason for using CB powder for imparting electrical resistance properties is that, compared with other known conducting materials such as metals and metal oxides, CB exhibits excellent dispersibility as well as excellent stability (change over time after mixing and dispersion) in a prepared monomer mixed solution, and does not have any adverse effects on polycondensation.

There are various kinds of CB powder with various properties (electrical resistance, volatile content, specific surface area, particle diameter, pH value, DBP oil absorption, etc.) depending on the source (natural gas, acetylene gas, coal tar, etc.) and production conditions (combustion conditions). It is desirable to employ CB powder that is capable of stably providing a desired electrical resistance without variation even when a minimum amount thereof is mixed and dispersed.

Such conductive CB powder usually has a mean particle diameter of about 15 to about 65 nm. When used, for example, for electrophotographic intermediate transfer belts for color printers, color copying machines or the like, CB powder having a mean particle diameter of about 20 to about 40 nm is particularly preferable.

Examples thereof include channel black and oxidized furnace black. Specific examples include Special Black 4 (pH 3, volatile content 14%, particle diameter 25 nm) and Special Black 5 (pH 3, volatile content 15%, particle diameter 20 nm), manufactured by Degusa Corporation.

The method for mixing CB powder into an aromatic amic acid oligomer solution is not limited as long as such CB powder can be uniformly mixed and dispersed in the aromatic amic acid oligomer solution. For example, ball mills, sand mills, and ultrasonic mills are usable.

CB powder is added preferably in an amount of about 3 to about 30 parts by weight (and preferably about 10 to about 25 parts by weight) per 100 parts by weight of the total amount of the aromatic tetracarboxylic acid derivatives and the organic diamine(s), which are starting materials for the aromatic amic acid oligomer.

The purpose of using CB powder in such an amount is to provide the film with volume resistivity (VR) and surface resistivity (SR) in a semi-conductive range. The lower limit is set at not less than about 3 parts by weight because at least this amount is necessary to obtain sufficient conductivity. The upper limit is set at not more than about 30 parts by weight for the purpose of lowering the resistance and maintaining formability to thereby prevent the film properties from deteriorating.

The semi-conductive aromatic amic acid composition has a nonvolatile content of about 30 to about 45% by weight. The nonvolatile matter has a CB powder content of about 3 to about 25% by weight (and preferably about 10 to about 20% by weight), and an aromatic amic acid oligomer-derived nonvolatile content of about 75 to about 97% by weight (and preferably about 80 to about 90% by weight).

Additives such as imidazole compounds (e.g., 2-methylimidazole, 1,2-dimethylimidazole, 2-methyl-4-methylimidazole, 2-ethyl-4-ethylimidazole, and 2-phenylimidazole) and surfactants (e.g., fluorosurfactants) can be added to the composition, within ranges that the effects of the present invention are not adversely affected.

A film-formation semi-conductive aromatic amic acid composition is thereby produced, in which CB powder is uniformly dispersed.

B-2. Semi-Conductive Seamless Tubular Polyimide Film

Hereinafter, a process of forming a semi-conductive tubular polyimide film using a semi-conductive aromatic amic acid composition as prepared above is described.

Rotational molding using a rotating drum is employed for this formation process. First, a semi-conductive aromatic amic acid composition is introduced into a rotating drum and uniformly cast over the entire inner surface.

The method for introduction/casting may be such that, for example, a semi-conductive aromatic amic acid composition in an amount sufficient to provide the desired final film thickness is introduced into a rotating drum while stationary, and the rotational speed is then gradually raised to an extent that centrifugal force is generated, so that the composition is cast uniformly over the entire inner surface by the centrifugal force. Alternatively, introduction/casting may be performed without using centrifugal force. According to one possible method, a horizontally elongated slit-like nozzle is arranged inside a rotating drum, and, while slowly rotating the drum, the nozzle is rotated (at a speed greater than the drum rotational speed). The film-formation semi-conductive aromatic amic acid composition is uniformly ejected from the nozzle over the entire inner surface of the drum.

In both methods, the rotating drum has its inner surface mirror-finished, and a barrier is arranged at the periphery of each end to prevent fluid leakage. The drum is mounted on rotating rollers, and is rotated indirectly by the rotation of the rollers.

A far-infrared radiation heater or the like is arranged around the drum, and heating is carried out indirectly by such an external heat source. The size of the drum depends on the size of the desired semi-conductive tubular PI film.

Heating is first carried out so that the inner surface of the drum is gradually heated to about 100 to about 190° C., and preferably to about 110 to about 130° C. (first heating step). The rate of heating is about 1 to about 2° C./min. This temperature is maintained for 1 to 2 hours, so that approximately half or more of the solvent is volatized, and a self-supporting tubular film is thereby formed. Although imidization requires a temperature of 280° C. or higher, if heating is carried out at such a high temperature from the beginning, the polyimide becomes highly crystalline, which adversely affects the CB dispersion state, further causing problems such as a film thus formed lacking toughness. Therefore, as a first heating step, the temperature is raised not higher than about 190° C., and the polycondensation reaction is completed at such a temperature, so as to obtain a tough tubular PI film.

After this step, heating to complete imidization is then carried out as a second heating step at about 280 to about 400° C. (and preferably about 300 to about 380° C.). In this step, the temperature is also preferably raised from the temperature of the first heating step gradually, rather than rapidly.

The second heating step may be performed while the seamless tubular film is adhered to the inner surface of the rotating drum, or alternatively, it is also possible to separate and remove the seamless tubular film from the rotating drum after the first heating step, and separately heat the film to 280 to 400° C. by a heating means for imidization. Such imidization usually takes about 2 to 3 hours. Accordingly, the entire process of the first and second heating steps usually takes about 4 to about 7 hours in total.

A semi-conductive seamless tubular PI film of the invention is thus produced. The film usually has a thickness of about 50 to about 150 µm, although not limited thereto, and preferably about 60 to about 120 µm. When used as an electrophotographic intermediate transfer belt, a thickness of about 75 to about 100 µm is particularly preferable.

The semiconductivity of the film is an electrical resistance property determined by the volume resistivity ($\Omega \cdot cm$) (hereinafter referred to as "VR") and surface resistivity ($\Omega/sq$) (hereinafter referred to as "SR"). Such a property is due to CB powder having been mixed and dispersed therein. Basically, the resistivity can be freely varied by varying the amount of CB powder to be mixed. The film of the invention may have, for example, a resistivity within the range of VR:$10^2$ to $10^{14}$ and SR:$10^3$ to $10^{15}$, and preferably VR:$10^6$ to $10^{13}$ and SR:$10^7$ to $10^{14}$. Such a resistivity range can be easily achieved by using CB powder in an amount as specified above. The CB content of the film of the invention is usually about 3 to about 25% by weight, and preferably about 10 to about 20% by weight.

The semi-conductive PI film of the invention has extremely uniform electrical resistivity. More specifically, the semi-conductive PI film of the invention is characterized by small variation in log surface resistivity SR and log volume resistivity VR; that is, their log standard deviations of all the measurement points of the film are each 0.2 or less, and preferably 0.15 or less. The film of the invention is also characterized in that the difference in surface resistivities (in terms of log) between its front and rear surfaces is as small as 0.4 or less, and preferably 0.2 or less. The film of the invention is further characterized in that the value obtained by subtracting Log VR (log volume resistivity) from Log SR (log surface resistivity) can be maintained at a level as high as 1.0 to 3.0, and preferably 1.3 to 3.0.

Such excellent electrical characteristics of the PI film of the present invention are attributed to the use in its production of a semi-conductive aromatic amic acid composition, which has an "aromatic amic acid oligomer" and CB powder mixed therein. More specifically, the reason for such excellent electrical characteristics is presumably that the composition has CB powder uniformly dispersed with an aromatic amic acid oligomer, and, during film production, polymerization of the composition can proceed while maintaining such a uniform dispersion.

The PI film of the invention is applicable to a wide range of uses due to its excellent electrical resistance properties and other characteristics. Examples of important applications that require electrostatic properties include electrophotographic intermediate transfer belts for color printers, color copying machines, or the like. Such a belt requires a semiconductivity (resistivity) of, for example, VR $10^9$ to $10^{12}$ and SR $10^{10}$ to $10^{13}$, and accordingly, the semi-conductive seamless tubular PI film of the invention is suitable.

The semi-conductive PI film of the invention is highly efficient as a belt, and has high yield stress ($\sigma_Y$) and high tensile strength ($\sigma_{cr}$). The yield stress ($\sigma_Y$) is 120 Mpa or more, particularly 120 to 160 Mpa, and the ratio of tensile strength to yield stress ($\sigma_{cr}/\sigma_Y$) is 1.10 or more, particularly about 1.10 to about 1.35.

C. THIRD EMBODIMENT

The electrically semi-conductive seamless tubular polyimide-based film (hereinafter sometimes referred to as "semi-conductive tubular PI-based film") of the present invention is produced by rotationally molding and heat treating (imidizing) a semi-conductive polyimide-based precursor composition (hereinafter sometimes referred to as "semi-conductive PI precursor composition").

C-1. Semi-Conductive Polyimide-Based Precursor Composition

The semi-conductive polyimide-based precursor composition of the present invention is produced by first dissolving approximately equimolar amounts of 1) at least two aromatic tetracarboxylic acid diesters and 2) at least one aromatic diamine in an organic polar solvent to obtain a nylon salt-type monomer solution, then mixing a high-molecular-weight polyimide precursor solution or a high-molecular-weight polyamideimide solution with the nylon salt-type monomer solution to prepare a mixed solution, and then uniformly dispersing carbon black (hereinafter sometimes referred to as "CB") in the mixed solution.

(1) Aromatic Tetracarboxylic Acid Diesters (Half Esterified)

A mixture of at least one asymmetric aromatic tetracarboxylic acid diester and at least one symmetric aromatic tetracarboxylic acid diester is used as said at least two aromatic tetracarboxylic acid diester starting materials.

Asymmetric aromatic tetracarboxylic acid diesters for use in the present invention are explained hereinafter.

Examples of asymmetric aromatic tetracarboxylic acids include:

compounds in which four carboxyl groups are bound non-point-symmetrically to a monocyclic or polycyclic aromatic ring system (e.g., benzene nucleus, naphthalene nucleus, biphenyl nucleus, and anthracene nucleus); and compounds in which four carboxyl groups are bound non-point-symmetrically to two monocyclic aromatic rings (e.g., benzene nuclei) linked by a group such as —CO—, —CH$_2$— or —SO$_2$—, or by a single bond.

Specific examples of asymmetric aromatic tetracarboxylic acids include 1,2,3,4-benzenetetracarboxylic acid, 1,2,6,7-naphthalenetetracarboxylic acid, 2,3,3',4'-biphenyltetracarboxylic acid, 2,3,3',4'-benzophenonetetracarboxylic acid, 2,3,3',4'-diphenyl ether tetracarboxylic acid, 2,3,3',4'-diphenylmethanetetracarboxylic acid, and 2,3,3',4'-diphenylsulfonetetracarboxylic acid.

Examples of asymmetric aromatic tetracarboxylic acid diesters (i.e., half esterified) for use in the present invention include diesters of such asymmetric aromatic tetracarboxylic acids. Specific examples thereof include compounds in which two of the four carboxyl groups of the asymmetric aromatic tetracarboxylic acid are esterified with one of each pair of adjacent carboxyl groups on an aromatic ring being esterified.

Examples of the two esters of such asymmetric aromatic tetracarboxylic acid diesters include di(lower alkyl)esters, and preferably C$_{1-3}$ alkyl esters, such as dimethyl esters, diethyl esters, and dipropyl esters (particularly, dimethyl esters).

Among such asymmetric aromatic tetracarboxylic acid diesters, 2,3,3',4'-biphenyltetracarboxylic acid dimethyl esters and 2,3,3',4'-biphenyltetracarboxylic acid diethyl esters are preferable, with 2,3,3',4'-biphenyltetracarboxylic acid dimethyl esters being particularly preferable.

Asymmetric aromatic tetracarboxylic acid diesters as above are commercially available, and can also be produced by known methods. They can be easily produced, for example, by reacting the corresponding asymmetric aromatic tetracarboxylic dianhydride with the corresponding alcohol (e.g., lower alcohol, preferably C$_{1-3}$ alcohol) at a molar ratio of 1:2. By such a method, the acid anhydride, which is a starting material, reacts with the alcohol and thereby undergoes ring opening, providing a diester (half esterified) having an ester group and a carboxyl group on respective adjacent carbons on an aromatic ring.

Symmetric aromatic tetracarboxylic acid diesters for use in the present invention are explained hereinafter.

Examples of symmetric aromatic tetracarboxylic acids include:

compounds in which four carboxyl groups are bound point-symmetrically to a monocyclic or polycyclic aromatic ring system (e.g., benzene nucleus, naphthalene nucleus, biphenyl nucleus, and anthracene nucleus); and compounds in which four carboxyl groups are bound point-symmetrically to two monocyclic aromatic rings (e.g., benzene nuclei) linked by a group such as —CO—, —O—, —CH$_2$— or —SO$_2$—, or by a single bond.

Specific examples of symmetric aromatic tetracarboxylic acids include 1,2,4,5-benzenetetracarboxylic acid, 2,3,6,7-naphthalenetetracarboxylic acid, 3,3',4,4'-biphenyltetracarboxylic acid, 3,3',4,4'-benzophenone tetracarboxylic acid, 3,3',4,4'-diphenyl ether tetracarboxylic acid, 3,3',4,4'-diphenylmethanetetracarboxylic acid, and 3,3',4,4'-diphenylsulfonetetracarboxylic acid.

Examples of symmetric aromatic tetracarboxylic acid diesters (i.e., half esterified) for use in the present invention include diesters of such symmetric aromatic tetracarboxylic acids (i.e., half esterified). Specific examples thereof include compounds in which two of the four carboxyl groups of the symmetric aromatic tetracarboxylic acid are esterified with one of each pair of adjacent carboxyl groups on an aromatic ring being esterified.

Examples of the two esters of such symmetric aromatic tetracarboxylic acid diesters include di(lower alkyl)esters, and preferably C$_{1-3}$ alkyl esters, such as dimethyl esters, diethyl esters, and dipropyl esters (particularly, dimethyl esters).

Among such symmetric aromatic tetracarboxylic acid diesters, 3,3',4,4'-biphenyltetracarboxylic acid dimethyl esters, 3,3',4,4'-biphenyltetracarboxylic acid diethyl esters, 1,2,4,5-benzenetetracarboxylic acid dimethyl esters, and 1,2,4,5-benzenetetracarboxylic acid diethyl esters are preferable, with 3,3',4,4'-biphenyltetracarboxylic acid dimethyl esters being particularly preferable.

Symmetric aromatic tetracarboxylic acid diesters as above are commercially available, and can also be produced by known methods. They can be easily produced, for example, by a known method of reacting the corresponding symmetric aromatic tetracarboxylic dianhydride with the corresponding alcohol (e.g., lower alcohol, preferably C$_{1-3}$ alcohol) at a molar ratio of 1:2. By such a method, the acid anhydride, which is a starting material, reacts with the alcohol and thereby undergoes ring opening, providing a diester (half esterified) having an ester group and a carboxyl group on respective adjacent carbons on an aromatic ring.

The mixing ratio for asymmetric and symmetric aromatic tetracarboxylic acid diesters is specified such that the proportion of asymmetric aromatic tetracarboxylic acid diester(s) is about 10 to about 50 mol % (and preferably about 20 to about 40 mol %) and the proportion of symmetric aromatic tetracarboxylic acid diester(s) is about 90 to about 50 mol % (and preferably about 80 to about 60 mol %). It is particularly preferable to use about 20 to about 30 mol % of asymmetric tetracarboxylic aromatic acid diester(s) and about 70 to about 80 mol % of symmetric aromatic tetracarboxylic acid diester(s).

The combined use of such symmetric and asymmetric aromatic tetracarboxylic acid diesters is essential for the following reasons. Use of only symmetric aromatic tetracarboxylic acid diesters induces crystallization of a polyimide film and thereby causes powderization of the film during heat treatment, which thus cannot achieve film formation. Although use of only asymmetric aromatic tetracarboxylic acid derivatives achieves the formation of a seamless tubular PI film, such an obtained film has inferior yield stress and elastic modulus, and, when used as a rotational belt, it suffers from problems such as low driving responsiveness and early elongation of the belt.

In contrast, the use of mixed aromatic tetracarboxylic acid diesters achieves extremely high film-forming capability (formability), and provides a semi-conductive seamless tubular PI film having high yield stress and elastic modulus.

Further, the addition of an asymmetric aromatic tetracarboxylic acid diester presumably causes a polyamic acid molecule to bend, thereby imparting flexibility.

The effects of the coexistence of such asymmetric and symmetric aromatic tetracarboxylic acid derivatives are most apparent when they are mixed at a ratio as specified above.

(2) Aromatic Diamine

Examples of aromatic diamines include compounds having two amino groups on a single aromatic ring (e.g., benzene nucleus), and compounds having two amino groups in which two or more aromatic rings (e.g., benzene nuclei) are linked by a group such as —O—, —S—, —CO—, —CH$_2$—, —SO— or —SO$_2$—, or by a single bond. Specific examples thereof include p-phenylenediamine, o-phenylenediamine, m-phenylenediamine, 4,4'-diaminodiphenyl ether, 4,4'-diaminodiphenyl thioether, 4,4'-diaminodiphenylcarbonyl, 4,4'-diaminodiphenylmethane, and 1,4-bis(4-aminophenoxy)benzene. Among these, 4,4'-diaminodiphenyl ether is particularly preferable. Use of such an aromatic diamine allows the reaction to proceed more smoothly, and provides a film having greater toughness and higher heat resistance.

(3) Nylon Salt-Type Monomer Solution

At least two aromatic tetracarboxylic acid diesters as above and an equimolar amount of at least one aromatic diamine as above are uniformly mixed in an organic polar solvent, providing a nylon salt-type monomer solution. Heating may be performed (at, for example, about 40 to about 70° C.), if necessary, for such uniform dissolution of the components in an organic polar solvent.

An aprotic organic polar solvent is preferable as an organic polar solvent. Examples thereof include N-methyl-2-pyrrolidone (hereafter referred to as "NMP"), N,N-dimethylformamide, N,N-diethylformamide, N,N-dimethylacetamide, dimethylsulfoxide, hexamethylphosphoramide, and 1,3-dimethyl-2-imidazolidinone. Such solvents may be used singly, and a mixed solvent of two or more such solvents can also be used. NMP is particularly preferable. The amount of organic polar solvent is set to about 100 to about 300 parts by weight (and preferably about 120 to about 200 parts by weight) per 100 parts by weight of the total amount of said at least two aromatic tetracarboxylic acid diesters and said at least one aromatic diamine (starting materials).

Such a nylon salt-type monomer solution presumably has a constitution in which, for example, ion pairs of carboxylate ions of the aromatic tetracarboxylic acid diesters and ammonium ions of the aromatic diamine are present in a substantially monomeric state in an organic polar solvent (see, e.g., the formula given below). Further, such ions can be dissolved in an organic polymer solvent as above extremely easily because of their substantially monomeric state, thus providing the advantage that the amount of solvent used can be minimized.

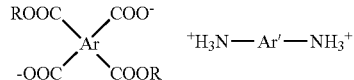

(Ar is a tetravalent residue obtained by removing two carboxyl groups and two ester groups from an aromatic tetracarboxylic acid, Ar' is a divalent residue obtained by removing two amino groups from an aromatic diamine, and R is an alkyl group)

(4) High-Molecular-Weight Polymide Precursor Solution and High-Molecular-Weight Polyamideimide Solution A polyamic acid solution having a number average molecular weight of 10000 or more is used as the high-molecular-weight polymide precursor solution, and a polyamideimide solution having a number average molecular weight of 10000 or more is used as the high-molecular-weight polyamideimide solution. A number average molecular weight as used herein is a value measured by GPC (solvent :NMP, calculated with reference to polyethylene oxide).

Polyamic Acid Solution

A polyamic acid solution having a number average molecular weight of 10000 or more is produced, for example, by a known method using, as starting materials, a biphenyl tetracarboxylic dianhydride and a diaminodiphenyl ether component in an organic polar solvent. Usable organic polar solvents are those described above for use in a nylon salt-type monomer solution.

Examples of biphenyl tetracarboxylic dianhydrides include 2,3,3',4'-biphenyl tetracarboxylic dianhydride (a-BPDA), 3,3',4,4'-biphenyl tetracarboxylic dianhydride (s-BPDA), and 2,2',3,3'-biphenyl tetracarboxylic dianhydride.

Examples of diaminodiphenyl ether components include 4,4'-diaminodiphenyl ether, 3,3'-diaminodiphenyl ether, and 3,4'-diamino diphenyl ether.

Such a biphenyl tetracarboxylic dianhydride and diaminodiphenyl ether component are mixed in approximately equimolar amounts. A known method can be employed for the polycondensation reaction thereof. An example thereof is a method for preparing a polyamic acid solution, in which a biphenyl tetracarboxylic acid component is added to a solution containing a diaminodiphenyl ether component at room temperature (about 15 to about 30° C.) and thereby amidated. Such an obtained polyamic acid has a number average molecular weight of 10000 or more, and preferably 12000 to 20000.

Polyamideimide Solution

A polyamideimide solution having a number average molecular weight of 10000 or more is produced by a known reaction, such as polycondensation of an acid anhydride component comprising trimellitic anhydride and benzophenonetetracarboxylic anhydride with an aromatic isocyanate in an organic solvent. Usable organic polar solvents are those described above for use in a nylon salt-type monomer solution.

The acid anhydride component has a trimellitic anhydride proportion of about 70 to about 95 mol %, and a benzophenonetetracarboxylic anhydride proportion of about 5 to about 30 mol %.

Examples of aromatic isocyanates include bitolylene diisocyanate, 3,3'-diphenylsulfone diisocyanate, isophorone diisocyanate, 1,4-diisocyanate, 4,4'-dicyclohexylmethane diisocyanate, m-xylene diisocyanate, p-xylene diisocyanate, and 1,4-cyclohexylene diisocyanate.

Such an aromatic isocyanate is used in such an amount that the total number of aromatic isocyanate groups is equivalent to the total number of carboxyl groups and acid anhydride groups of the acid component.

Such polyamideimide has a number average molecular weight of 10000 or more, and preferably about 15000 to about 20000.

(5) Mixed Solution

A nylon salt-type monomer solution as above and a high-molecular-weight polymide precursor solution or high-molecular-weight polyamideimide solution as above are mixed, providing a mixed solution. A known method, such as a propeller mixer, magnetic stirrer, or pot mill, can be employed for this mixing.

They are preferably mixed in such amounts (ratio) that the high-molecular-weight polymide precursor solution (in particular, a polyamic acid solution having a number average molecular weight of 10000 or more) or the high-molecular-weight polyamideimide solution (polyamideimide solution having a number average molecular weight of 10000 or more) has about 10 to about 50 parts by weight (and preferably about 20 to about 30 parts by weight) of nonvolatile matter per 100 parts by weight of the nonvolatile matter of the nylon salt-type monomer solution. "Nonvolatile matter" herein is as measured by the method described in Example C-1.

When the high-molecular-weight polymide precursor solution or high-molecular-weight polyamideimide solution has less than 10 parts by weight of nonvolatile matter per 100 parts by weight of the nonvolatile matter of the nylon salt-type monomer solution, it becomes difficult to achieve the effects of the present invention. When the nonvolatile matter is more than 50 parts by weight and carbon black is added to such a solution, rate of viscosity increase becomes remarkably high and pulverization of the carbon black becomes difficult, and as a result, the addition of a large amount of organic polar solvent is required, thereby reducing production efficiency.

(6) Semi-Conductive PI Precursor Composition

Conductive CB powder is uniformly dispersed in such a mixed solution, providing a semi-conductive PI precursor composition.

The reason for using CB powder for imparting electrical resistance properties is that (compared with other known conducting materials such as metals and metal oxides) CB exhibits excellent dispersibility as well as excellent stability (change over time after mixing and dispersion) in a prepared monomer mixed solution, and does not have any adverse effects on polycondensation.

There are various kinds of CB powder with various properties (electrical resistance, volatile content, specific surface area, particle diameter, pH value, DBP oil absorption, etc.) depending on the source (natural gas, acetylene gas, coal tar, etc.) and production conditions (combustion conditions). It is desirable to employ CB powder that is capable of stably providing a desired electrical resistance without variation even when a minimum amount thereof is mixed and dispersed.

Such conductive CB powder usually has a mean particle diameter of about 15 to about 65 nm. When used, for example, for electrophotographic intermediate transfer belts for color printers, color copying machines or the like, CB powder having a mean particle diameter of about 20 to about 40 nm is particularly preferable.

Carbon black having a high conductivity index, such as ketjen black and acetylene black, is likely to lead to the formation of secondary aggregation (structure) and the occurrence of a conductivity chain, and accordingly, control within the semi-conductive region is difficult. Therefore, use of acidic carbon black, which is unlikely to lead to such structure formation, is effective.

Examples thereof include channel black and oxidized furnace black. Specific examples include Special Black 4 (pH 3, volatile content 14%, particle diameter 25 nm) and Special Black 5 (pH 3, volatile content 15%, particle diameter 20 nm), manufactured by Degusa Corporation.

The method for mixing CB powder is not limited as long as such CB powder can be uniformly mixed and dispersed in the mixed solution. For example, ball mills, sand mills, and ultrasonic mills are usable.

CB powder is added preferably in an amount of about 5 to about 40 parts by weight (and preferably about 10 to about 30 parts by weight) per 100 parts by weight of the total amount of:

1) aromatic tetracarboxylic acid diester and organic diamine, which are starting materials for the nylon salt-type monomer; and
2) acid anhydride and diamine, which are starting materials for the high-molecular-weight polyimide precursor, or acid anhydrides and aromatic isocyanate, which are starting materials for the high-molecular-weight polyamideimide.

The purpose of using CB powder in such an amount is to provide the film with volume resistivity (VR) and surface resistivity (SR) in a semi-conductive range. The lower limit is set at not less than about 5 parts by weight because at least this amount is necessary to obtain sufficient conductivity. The upper limit is set at not more than about 40 parts by weight for the purpose of lowering the resistance and maintaining formability to thereby prevent the film properties from deteriorating.

The semi-conductive PI precursor composition has a nonvolatile content of about 20 to about 60% by weight, and this nonvolatile matter has a CB powder content of about 5 to about 30% by weight (and preferably about 9 to about 23% by weight). "Nonvolatile content" as used herein means a content measured by the method described in Example C-1.

Additives such as imidazole compounds (e.g., 2-methylimidazole, 1,2-dimethylimidazole, 2-methyl-4-methylimidazole, 2-ethyl-4-ethylimidazole, and 2-phenylimidazole) and surfactants (e.g., fluorosurfactants) can be added to the composition, within ranges that the effects of the present invention are not adversely affected.

A film-formation semi-conductive PI precursor composition is thereby produced, in which CB powder is uniformly dispersed.

By mixing a high-molecular-weight polymide precursor solution or a high-molecular-weight polyamideimide solution with a nylon salt-type monomer, the storage stability of the uniform dispersion of carbon black in the semi-conductive PI precursor composition of the present invention is remarkably improved. Further, a conductive tubular polyimide-based film formed by rotationally molding such a semi-conductive PI precursor composition has excellent electrical conductivity, i.e., extremely stable and uniform electrical resistivity in the thickness direction. The reasons for this are not certain but are presumably that, because a polymer having a relatively high number average molecular weight is present in the polyimide-based precursor composition, the aggregation of carbon black is suppressed by physical entanglement between the polymer component and carbon black and also by the viscosity of the polymer. Furthermore, presumably, the polymer's viscosity alleviates the effects on carbon black particles caused by centrifugal force during rotational molding, and also alleviates the effects caused by thermal convection or evaporative convection during the volatilization of solvent, and moreover, the reaction rate of heat-induced polymerizaiton can be moderated.

C-2. Conductive Seamless Tubular Polyimide-Based Film

Hereinafter, a process of forming a conductive tubular PI-based film using a semi-conductive PI precursor composition as prepared above is described.

Rotational molding using a rotating drum is employed for this formation process. First, a semi-conductive PI precursor composition is introduced into a rotating drum and uniformly cast over the entire inner surface.

The method for introduction/casting may be such that, for example, a semi-conductive PI precursor composition in an amount sufficient to provide the desired final film thickness is introduced into a rotating drum while stationary, and the rotational speed is then gradually raised to an extent that centrifugal force is generated. The composition is cast uniformly over the entire inner surface by the centrifugal force. Alternatively, introduction/casting may be performed without using centrifugal force. According to one possible method, a horizontally elongated slit-like nozzle is arranged inside a rotating drum, and, while slowly rotating the drum, the nozzle is rotated (at a speed greater than the drum rotational speed). The film-formation semi-conductive PI precursor composition is uniformly ejected from the nozzle over the entire inner surface of the drum.

In both methods, the rotating drum has its inner surface mirror-finished, and a barrier is arranged at the periphery of each end to prevent fluid leakage. The drum is mounted on rotating rollers, and is rotated indirectly by the rotation of the rollers.

A far-infrared radiation heater or the like is arranged around the drum, and heating is carried out indirectly by such an external heat source. The size of the drum depends on the size of the desired semi-conductive tubular PI film.

Heating is first carried out so that the inner surface of the drum is gradually heated to about 100 to about 190° C., and preferably to about 110 to about 130° C. (first heating step). The rate of heating is about 1 to about 2° C./min. This temperature is maintained for 1 to 3 hours, so that approximately half or more of the solvent is volatized, and a self-supporting tubular film is thereby formed. Although imidization requires a temperature of 280° C. or higher, if heating is carried out at such a high temperature from the beginning, the polyimide becomes highly crystalline, which adversely affects the CB dispersion state, further causing problems such as a film thus formed lacking toughness. Therefore, as a first heating step, the temperature is raised not higher than about 190° C., and the polycondensation reaction is completed at such a temperature, so as to obtain a tough tubular PI film.

After this step, heating to complete imidization is then carried out as a second heating step at about 280 to about 400° C. (and preferably about 300 to about 380° C.). In this step, the temperature is also preferably raised from the temperature of the first heating step gradually, rather than rapidly.

The second heating step may be performed while the seamless tubular film is adhered to the inner surface of the rotating drum, or alternatively, it is also possible to separate and remove the seamless tubular film from the rotating drum after the first heating step, and separately heat the film to 280 to 400° C. by a heating means for imidization. Such imidization usually takes about 2 to 3 hours. Accordingly, the entire process of the first and second heating steps usually takes about 4 to about 7 hours in total.

A conductive seamless tubular PI film of the invention is thus produced. The film usually has a thickness of about 30 to about 200 μm, although not limited thereto, and preferably about 50 to about 120 μm. When used as an electrophotographic intermediate transfer belt, a thickness of about 70 to about 100 μm is particularly preferable.

The semiconductivity of the film is an electrical resistance property determined by the volume resistivity (Ω·cm) (hereinafter referred to as "VR") and surface resistivity (Ω/sq) (hereinafter referred to as "SR"). Such a property is due to CB powder having been mixed and dispersed therein. Basically, the resistivity can be freely varied by varying the amount of CB powder to be mixed. The film of the invention may have, for example, a resistivity within the range of VR: $10^2$ to $10^{14}$ and SR: $10^3$ to $10^{15}$, and preferably VR: $10^6$ to $10^{13}$ and SR: $10^7$ to $10^{14}$. Such a resistivity range can be easily achieved by using CB powder in an amount as specified above. The CB content of the film of the invention is usually about 5 to about 30% by weight, and preferably about 9 to about 23% by weight.

The semi-conductive PI film of the present invention has extremely uniform electrical resistivity. More specifically, the semi-conductive PI film of the invention is characterized by small variation in log surface resistivity SR and log volume resistivity VR; that is, their log standard deviations of all the measurement points of the film are each 0.2 or less, and preferably 0.15 or less. The film of the invention is also characterized in that the difference in surface resistivities (in terms of log) between its front and rear surfaces is as small as 0.4 or less, and preferably 0.2 or less. The film of the invention is further characterized in that the value obtained by subtracting Log VR (log volume resistivity) from Log SR (log surface resistivity) can be maintained at a level as high as 1.0 to 3.0, and preferably 1.5 to 3.0.

Such excellent electrical characteristics of the PI film of the present invention are attributed to the fact that, because a high-molecular-weight polyimide precursor or high-molecular-weight polyamideimide solution has been mixed therein, CB is uniformly physically incorporated into the entangling structure of the polymer chains, and accordingly, the effects caused by evaporation of solvent and/or the effects of polymerization of the nylon salt-type monomer during film production are reduced, whereby a conductive seamless polyimide-based film can be obtained while maintaining the uniform dispersion of CB achieved in the precursor composition solution.

The PI film of the invention is applicable to a wide range of uses due to its excellent electrical resistance properties and other characteristics. Examples of important applications that require electrostatic properties include electrophotographic intermediate transfer belts for color printers, color copying machines, or the like. Such a belt requires a semiconductivity (resistivity) of, for example, VR $10^9$ to $10^{12}$ and SR $10^{10}$ to $10^{13}$, and accordingly, the semi-conductive seamless tubular PI-based film of the invention is suitable.

The semi-conductive PI film of the invention is highly efficient as a belt, and has high yield stress ($\sigma_Y$) and high tensile strength ($\sigma_{cr}$). The yield stress ($\sigma_Y$) is 120 Mpa or more, particularly 120 to 160 Mpa, and the ratio of tensile strength to yield stress ($\sigma_{cr}/\sigma_Y$) is 1.10 or more, particularly about 1.10 to about 1.35.

D. FOURTH EMBODIMENT

The electrically semi-conductive seamless tubular polyimide film (hereinafter sometimes referred to as "semi-conductive tubular PI film") of the present invention is produced by rotationally molding and heat treating (imidizing) a semi-conductive high-concentration polyimide precursor composition (hereinafter sometimes referred to as "semi-conductive high-concentration PI precursor composition").

D-1. Semi-Conductive High-Concentration Polyimide Precursor Composition

The semi-conductive high-concentration polyimide precursor composition is produced by first uniformly dispersing carbon black (hereinafter sometimes referred to as "CB") in an organic polar solvent to obtain a carbon black dispersion, and then dissolving approximately equimolar amounts of aromatic tetracarboxylic acid diester and aromatic diamine in the carbon black dispersion. That is, the composition is characterized in that it is produced by adding equimolar amounts of monomer starting materials (i.e., equimolar amounts of aromatic tetracarboxylic acid diester and aromatic diamine) to a pre-prepared uniform CB dispersion.

(1) Carbon Black Dispersion

In the present invention, conductive CB powder is used to impart semiconductivity to a PI precursor composition. The reason for using CB powder is that (compared with other known conducting materials such as metals and metal oxides) CB exhibits excellent dispersibility as well as excellent stability (change over time after mixing and dispersion) in a prepared semi-conductive high-concentration polyimide precursor composition, and does not have any adverse effects on polycondensation.

There are various kinds of CB powder with various properties (electrical resistance, volatile content, specific surface area, particle diameter, pH value, DBP oil absorption, etc.) depending on the source (natural gas, acetylene gas, coal tar, etc.) and production conditions (combustion conditions). It is desirable to employ CB powder that is capable of stably providing a desired electrical resistance without variation even when a minimum amount thereof is mixed and dispersed.

Such conductive CB powder usually has a mean particle diameter of about 15 to about 65 nm. When used, for example, for electrophotographic intermediate transfer belts for color printers, color copying machines or the like, CB powder having a mean particle diameter of about 20 to about 40 nm is particularly preferable.

Carbon black having a high conductivity index, such as ketjen black and acetylene black, is likely to lead to the formation of secondary aggregation (structure) and the occurrence of a conductivity chain, and accordingly, control within a semi-conductive range is difficult. Therefore, use of acidic carbon black, which is unlikely to lead to such structure formation, is effective.

Examples thereof include channel black and oxidized furnace black. Specific examples include Special Black 4 (pH 3, volatile content 14%, particle diameter 25 nm) and Special Black 5 (pH 3, volatile content 15%, particle diameter 20 nm), manufactured by Degusa Corporation.

An aprotic organic polar solvent is preferable as an organic polar solvent used for a carbon black dispersion. Examples thereof include N-methyl-2-pyrrolidone (hereafter referred to as "NMP"), N,N-dimethylformamide, N,N-diethylformamide, N,N-dimethylacetamide, dimethylsulfoxide, hexamethylphosphoramide, and 1,3-dimethyl-2-imidazolidinone. Such solvents may be used singly, and a mixed solvent of two or more such solvents can also be used. NMP is particularly preferable.

A carbon black dispersion is produced by uniformly dispersing CB powder in such an organic polar solvent. The method for mixing CB powder is not limited as long as such CB powder can be uniformly mixed and dispersed in an organic polar solvent. For example, ball mills, sand mills, and ultrasonic mills are usable.

CB powder is used in an amount of about 3 to about 25 parts by weight, and preferably about 5 to about 15 parts by weight, per 100 parts by weight of organic polar solvent. These amounts are in a range where the viscosity of the organic polar solvent does not increase and secondary aggregation of CB due to Van der Waals force is prevented. The lower limit is set at not less than 3 parts by weight per 100 parts by weight of organic polar solvent because at least such an amount is necessary in order to prevent decrease in the nonvolatile content of a produced high-concentration polyimide precursor composition. The upper limit is set at not more than 25 parts by weight for the purpose of maintaining enough distance between the uniformly dispersed CB powder particles and thereby preventing secondary coagulation due to Van der Waals force.

(2) Aromatic Tetracarboxylic Acid Diesters (Half Esterified)

A mixture of at least one asymmetric aromatic tetracarboxylic acid diester and at least one symmetric aromatic tetracarboxylic acid diester is used as at least two aromatic tetracarboxylic acid diester starting materials.

Asymmetric aromatic tetracarboxylic acid diesters for use in the present invention are explained hereinafter.

Examples of asymmetric aromatic tetracarboxylic acids include:

compounds in which four carboxyl groups are bound non-point-symmetrically to a monocyclic or polycyclic aromatic ring system (e.g., benzene nucleus, naphthalene nucleus, biphenyl nucleus, and anthracene nucleus); and compounds in which four carboxyl groups are bound non-point-symmetrically to two monocyclic aromatic rings (e.g., benzene nuclei) linked by a group such as —CO—, —CH$_2$— or —SO$_2$—, or by a single bond.

Specific examples of asymmetric aromatic tetracarboxylic acids include 1,2,3,4-benzenetetracarboxylic acid, 1,2,6,7-naphthalenetetracarboxylic acid, 2,3,3',4'-biphenyltetracarboxylic acid, 2,3,3',4'-benzophenonetetracarboxylic acid, 2,3,3',4'-diphenyl ether tetracarboxylic acid, 2,3,3',4'-diphenylmethanetetracarboxylic acid, and 2,3,3',4'-diphenylsulfonetetracarboxylic acid.

Examples of asymmetric aromatic tetracarboxylic acid diesters (i.e., half esterified) for use in the present invention include diesters of such asymmetric aromatic tetracarboxylic acids. Specific examples thereof include compounds in which two of the four carboxyl groups of the asymmetric aromatic tetracarboxylic acid are esterified with one of each pair of adjacent carboxyl groups on an aromatic ring being esterified.

Examples of the two esters of such asymmetric aromatic tetracarboxylic acid diesters include di(lower alkyl)esters, and preferably C$_{1-3}$ alkyl esters, such as dimethyl esters, diethyl esters, and dipropyl esters (particularly, dimethyl esters).

Among such asymmetric aromatic tetracarboxylic acid diesters, 2,3,3',4'-biphenyltetracarboxylic acid dimethyl esters and 2,3,3',4'-biphenyltetracarboxylic acid diethyl esters are preferable, with 2,3,3',4'-biphenyltetracarboxylic acid dimethyl esters being particularly preferable.

Asymmetric aromatic tetracarboxylic acid diesters as above are commercially available, and can also be produced by known methods. They can be easily produced, for example, by reacting the corresponding asymmetric aromatic tetracarboxylic dianhydride with the corresponding alcohol (e.g., lower alcohol, preferably C$_{1-3}$ alcohol) at a molar ratio of 1:2. By such a method, the acid anhydride, which is a starting material, reacts with the alcohol and thereby undergoes ring opening, providing a diester (half esterified) having an ester group and a carboxyl group on respective adjacent carbons on an aromatic ring.

Symmetric aromatic tetracarboxylic acid diesters for use in the present invention are explained hereinafter.

Examples of symmetric aromatic tetracarboxylic acids include:

compounds in which four carboxyl groups are bound point-symmetrically to a monocyclic or polycyclic aromatic ring system (e.g., benzene nucleus, naphthalene nucleus, biphenyl nucleus, and anthracene nucleus); and compounds in which four carboxyl groups are bound point-symmetrically to two monocyclic aromatic rings (e.g., benzene nuclei) linked by a group such as —CO—, —O—, —CH$_2$— or —SO$_2$—, or by a single bond.

Specific examples of symmetric aromatic tetracarboxylic acids include 1,2,4,5-benzenetetracarboxylic acid, 2,3,6,7-naphthalenetetracarboxylic acid, 3,3',4,4'-biphenyltetracarboxylic acid, 3,3',4,4'-benzophenone tetracarboxylic acid, 3,3',4,4'-diphenyl ether tetracarboxylic acid, 3,3',4,4'-diphenylmethanetetracarboxylic acid, and 3,3',4,4'-diphenylsulfonetetracarboxylic acid.

Examples of symmetric aromatic tetracarboxylic acid diesters (i.e., half esterified) for use in the present invention include diesters of such symmetric aromatic tetracarboxylic acids (i.e., half esterified). Specific examples thereof include compounds in which two of the four carboxyl groups of the symmetric aromatic tetracarboxylic acid are esterified with one of each pair of adjacent carboxyl groups on an aromatic ring being esterified.

Examples of the two esters of such symmetric aromatic tetracarboxylic acid diesters include di(lower alkyl)esters, and preferably C$_{1-3}$ alkyl esters, such as dimethyl esters, diethyl esters, and dipropyl esters (particularly, dimethyl esters).

Among such symmetric aromatic tetracarboxylic acid diesters, 3,3',4,4'-biphenyltetracarboxylic acid dimethyl esters, 3,3',4,4'-biphenyltetracarboxylic acid diethyl esters, 1,2,4,5-benzenetetracarboxylic acid dimethyl esters, and 1,2,4,5-benzenetetracarboxylic acid diethyl esters are preferable, with 3,3',4,4'-biphenyltetracarboxylic acid dimethyl esters being particularly preferable.

Symmetric aromatic tetracarboxylic acid diesters as above are commercially available, and can also be produced by known methods. They can be easily produced, for example, by a known method of reacting the corresponding symmetric aromatic tetracarboxylic dianhydride with the corresponding alcohol (e.g., lower alcohol, preferably C$_{1-3}$ alcohol) at a molar ratio of 1:2. By such a method, the acid anhydride, which is a starting material, reacts with the alcohol and thereby undergoes ring opening, providing a diester (half esterified) having an ester group and a carboxyl group on respective adjacent carbons on an aromatic ring.

The mixing ratio for asymmetric and symmetric aromatic tetracarboxylic acid diesters is specified such that the proportion of asymmetric aromatic tetracarboxylic acid diester(s) is about 10 to about 50 mol % (and preferably about 20 to about 40 mol %) and the proportion of symmetric aromatic tetracarboxylic acid diester(s) is about 90 to about 50 mol % (and preferably about 80 to about 60 mol %). It is particularly preferable to use about 20 to about 30 mol % of asymmetric tetracarboxylic aromatic acid diester(s) and about 70 to about 80 mol % of symmetric aromatic tetracarboxylic acid diester(s).

The combined use of such symmetric and asymmetric aromatic tetracarboxylic acid diesters is essential for the following reasons. Use of only symmetric aromatic tetracarboxylic acid diesters induces crystallization of a polyimide film and thereby causes powderization of the film during heat treatment, which thus cannot achieve film formation. Although use of only asymmetric aromatic tetracarboxylic acid derivatives achieves the formation of a seamless tubular PI film, such an obtained film has inferior yield stress and elastic modulus, and, when used as a rotational belt, it suffers from problems such as low driving responsiveness and early elongation of the belt.

In contrast, the use of mixed aromatic tetracarboxylic acid diesters achieves extremely high film-forming capability (formability), and provides a semi-conductive seamless tubular PI film having high yield stress and elastic modulus.

Further, the addition of an asymmetric aromatic tetracarboxylic acid diester presumably causes a polyamic acid molecule to bend, thereby imparting flexibility.

The effects of the coexistence of such asymmetric and symmetric aromatic tetracarboxylic acid diesters are most apparent when they are mixed at a ratio as specified above.

(3) Aromatic Diamine

Examples of aromatic diamines include compounds having two amino groups on a single aromatic ring (e.g., benzene nucleus), and compounds having two amino groups in which two or more aromatic rings (e.g., benzene nuclei) are linked by a group such as —O—, —S—, —CO—, —CH$_2$—, —SO— or —SO$_2$—, or by a single bond. Specific examples thereof include p-phenylenediamine, o-phenylenediamine, m-phenylenediamine, 4,4'-diaminodiphenyl ether, 4,4'-diaminodiphenyl thioether, 4,4'-diaminodiphenylcarbonyl, 4,4'-diaminodiphenylmethane, and 1,4-bis(4-aminophenoxy)benzene. Among these, 4,4'-diaminodiphenyl ether is particularly preferable. Use of such an aromatic diamine allows the reaction to proceed more smoothly, and provides a film having greater toughness and higher heat resistance.

(4) Semi-Conductive High-Concentration Polyimide Precursor Composition

At least two aromatic tetracarboxylic acid diesters and an approximately equimolar amount of at least one aromatic diamine are added to a prepared carbon black dispersion, and dissolved therein.

Approximately equimolar amounts of aromatic tetracarboxylic acid component and organic diamine component are added to a carbon black dispersion, stirred, and uniformly dissolved therein, providing a semi-conductive high-concentration polyimide precursor composition. Heating may be performed (at, for example, about 40 to about 70° C.), if necessary, for such uniform dissolution of the components in a carbon black dispersion. Stirring or like known method can be employed to dissolve the components in the organic polar solvent therein.

The aromatic tetracarboxylic acid diesters and aromatic diamine are used in an amount such that the proportion of carbon black in the carbon black dispersion is about 5 to about 35 parts by weight (and preferably about 8 to about 30 parts by weight) per 100 parts by weight of the total amount of the aromatic tetracarboxylic acid diesters and the aromatic diamine(s). The purpose of using the components in such an amount is to provide the film with volume resistivity (VR) and surface resistivity (SR) in a semi-conductive range.

Such a semi-conductive high-concentration polyimide precursor composition presumably has a constitution in which, for example, ion pairs of carboxylate ions of the aromatic tetracarboxylic acid diesters and ammonium ions of the aromatic diamine are present in a substantially monomeric state in an organic polar solvent (see, e.g., the formula given below).

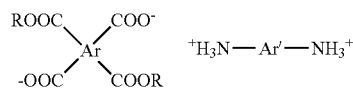

(Ar is a tetravalent residue obtained by removing two carboxyl groups and two ester groups from an aromatic tetracarboxylic acid, Ar' is a divalent residue obtained by removing two amino groups from an aromatic diamine, and R is an alkyl group)

Such ions can be dissolved in an organic polymer solvent as above extremely easily because of their substantially monomeric state, thus providing the advantage that the amount of solvent used can be minimized.

The composition may have a high nonvolative content of, for example, about 35 to about 60% by weight, and preferably about 40 to about 60% by weight. This nonvolatile matter may have a CB content of, for example, about 4 to about 30% by weight, and preferably about 10 to about 25% by weight. "Nonvolatile content" as used herein means a content measured by the method described in Example D-1.

Additives such as imidazole compounds (e.g., 2-methylimidazole, 1,2-dimethylimidazole, 2-methyl-4-methylimidazole, 2-ethyl-4-ethylimidazole, and 2-phenylimidazole) and surfactants (e.g., fluorosurfactants) can be added to the composition, within ranges that the effects of the present invention are not adversely affected.

A semi-conductive PI precursor composition is thereby produced, in which CB powder is uniformly dispersed and nonvolatile matter is dissolved or dispersed at a high concentration.

Because the semi-conductive high-concentration PI precursor composition of the present invention is obtained by dissolving aromatic tetracarboxylic acid diesters and an aromatic diamine component in a carbon black dispersion prepared by uniformly dispersing CB powder, the composition has CB powder uniformly dispersed therein, and the storage stability of the uniform dispersion of the carbon black is remarkably improved. Further, a conductive polyimide tube formed by rotationally molding such a semi-conductive PI precursor composition has excellent conductivity, i.e., extremely stable and uniform electrical resistivity in the thickness direction.

Because monomer starting materials are dissolved in a carbon black dispersion, the semi-conductive high-concentration PI precursor composition of the present invention has a remarkably increased nonvolatile content of about 35 to about 60% by weight. Accordingly, using the semi-conductive high-concentration PI precursor composition of the present invention, a thick film can be readily produced, and, because only a small amount of solvent is required, costs can be reduced and the evaporative removal of solvent can be simplified.

Further, the semi-conductive high-concentration PI precursor composition of the invention has an increased viscosity of about 10 to about 60 poise, and accordingly, in the production of a PI film, effects of centrifugal force during rotational molding are reduced.

D-2. Semi-Conductive Seamless Tubular Polyimide Film

Hereinafter, a process of forming a semi-conductive seamless tubular PI film using a semi-conductive PI precursor composition as prepared above is described.

Rotational molding using a rotating drum is employed for this formation process. First, a semi-conductive PI precursor composition is introduced into a rotating drum and uniformly cast over the entire inner surface.

The method for introduction/casting may be such that, for example, a semi-conductive PI precursor composition in an amount sufficient to provide the desired final film thickness is introduced into a rotating drum while stationary, and the rotational speed is then gradually raised to an extent that centrifugal force is generated. The composition is cast uniformly over the entire inner surface by the centrifugal force. Alternatively, introduction/casting may be performed without using centrifugal force. According to one possible method, a horizontally elongated slit-like nozzle is arranged inside a rotating drum, and, while slowly rotating the drum, the nozzle is rotated (at a speed greater than the drum rotational speed). The film-formation semi-conductive PI precursor composition is uniformly ejected from the nozzle over the entire inner surface of the drum. The drum is mounted on rotating rollers, and is rotated indirectly by the rotation of the rollers.

A far-infrared radiation heater or like heat source is arranged around the drum, and heating is carried out indirectly by such an external heat source. The size of the drum depends on the size of the desired semi-conductive tubular PI film.

Heating is first carried out so that the inner surface of the drum is gradually heated to about 100 to about 190° C., and preferably to about 110 to about 130° C. (first heating step). The rate of heating is about 1 to about 2° C./min. This temperature is maintained for 1 to 3 hours, so that approximately half or more of the solvent is volatized, and a self-supporting tubular film is thereby formed. Although imidization requires a temperature of 280° C. or higher, if heating is carried out at such a high temperature from the beginning, the polyimide becomes highly crystalline, which adversely affects the CB dispersion state, further causing problems such as a film thus formed lacking toughness. Therefore, as a first heating step, the temperature is raised not higher than about 190° C., and the polycondensation reaction is completed at such a temperature, so as to obtain a tough tubular PI film.

After this step, heating to complete imidization is then carried out as a second heating step at about 280 to about 400° C. (and preferably about 300 to about 380° C.). In this step, the temperature is also preferably raised from the temperature of the first heating step gradually, rather than rapidly.

The second heating step may be performed while the seamless tubular film is adhered to the inner surface of the rotating drum, or alternatively, it is also possible to separate and remove the seamless tubular film from the rotating drum after the first heating step, and separately heat the film to 280 to 400° C. by a heating means for imidization. Such imidization usually takes about 2 to 3 hours. Accordingly, the entire process of the first and second heating steps usually takes about 4 to about 7 hours in total.

A semi-conductive tubular PI film of the invention is thus produced. The film usually has a thickness of about 30 to about 200 μm, although not limited thereto, and preferably about 60 to about 120 μm. When used as an electrophotographic intermediate transfer belt, a thickness of about 75 to about 100 μm is particularly preferable.

The semiconductivity of the film is an electrical resistance property determined by the volume resistivity ($\Omega \cdot cm$) (hereinafter referred to as "VR") and surface resistivity ($\Omega/sq$) (hereinafter referred to as "SR"). Such a property is due to CB powder having been mixed and dispersed therein. Basically, the resistivity can be freely varied by varying the amount of CB powder to be mixed. The film of the invention may have, for example, a resistivity within the range of VR: $10^2$ to $10^{14}$ and SR: $10^3$ to $10^{15}$, and preferably VR: $10^6$ to $10^{13}$ and SR: $10^7$ to $10^{14}$. Such a resistivity range can be easily achieved by using CB powder in an amount as specified above. The CB content of the film of the invention is usually about 5 to about 25% by weight, and preferably about 8 to about 20% by weight.

The semi-conductive tubular PI film of the invention has extremely uniform electrical resistivity. More specifically, the semi-conductive tubular PI film of the invention is characterized by small variation in log surface resistivity SR and log volume resistivity VR; that is, their log standard deviations of all the measurement points of the film are each 0.2 or less, and preferably 0.15 or less. The film of the invention is also characterized in that the difference in surface resistivities (in terms of log) between its front and rear surfaces is as small as 0.4 or less, and preferably 0.2 or less. The film of the invention is further characterized in that the value obtained by subtracting Log VR (log volume resistivity) from Log SR (log surface resistivity) can be maintained at a level as high as 1.0 to 3.0, and preferably 1.5 to 3.0.

The PI film of the invention is applicable to a wide range of uses due to its excellent electrical resistance properties and other characteristics. Examples of important applications that require electrostatic properties include electrophotographic intermediate transfer belts for color printers, color copying machines, or the like. Such a belt requires a semiconductivity (resistivity) of, for example, VR $10^9$ to $10^{12}$ and SR $10^{10}$ to $10^{13}$, and accordingly, the semi-conductive seamless tubular PI film of the invention is suitable.

The semi-conductive PI film of the invention is highly efficient as a belt, and has high yield stress ($\sigma_Y$) and high tensile strength ($\sigma_{cr}$). The yield stress ($\sigma_T$) is 120 Mpa or more, particularly 120 to 160 Mpa, and the ratio of tensile strength to yield stress ($\sigma_{cr}/\nu_Y$) is 1.10 or more, particularly about 1.10 to about 1.35.

BEST MODE OF CARRYING OUT THE INVENTION

The present invention will be described below in greater detail with reference to Examples and Comparative Examples. The invention, however, is not limited to these examples.

A. FIRST EMBODIMENT

The first embodiment will be described below in much greater detail with reference to Examples and Comparative Examples.

In this example, yield stress (yield point stress), tensile strength, volume resistivity (VR), surface resistivity (SR), and nonvolatile matter content are measured as follows.

[yield stress (MPa) (referred to as $\sigma_Y$) and tensile strength (MPa) (referred to as $\sigma_{cr}$)]

A test piece 5 mm wide and 100 mm long was cut from a film as prepared in one of each of the Examples described below, and was measured by a uniaxial tensile tester (Autograph, a product of Shimadzu) at a gauge length of 40 mm and a crosshead of 200 mm/min. Based on the S—S curve recorded, $\sigma_Y$ and $\sigma_{cr}$ were determined.

These yield stress and tensile strength values are important factors in determining the strength of a material for a belt in preparing the same. The required minimum yield stress is at least 120 MPa so as to prevent plastic deformation (dimensional change by elongation) caused by stress applied during mounting.

Moreover, the tensile strength needs to be higher than the yield stress, which contributes to the life (toughness) against rotations of the belt. As a guide, at least $\sigma_{cr}/\sigma_Y=1.10$ is required.

[VR and SR]

A sample 400 mm long was cut from the obtained tubular film and was measured using a resistivity meter, "Hiresta IP/HR probe", manufactured by Mitsubishi Chemical Corporation at 40 points in total: five points in the width direction and eight points in the vertical direction (circumference) at the same pitch.

Note that VR was measured while applying a voltage of 100 V, seconds after beginning to apply the voltage and SR was measured while applying a voltage of 500 V, 10 seconds after beginning to apply the voltage.

[Nonvolatile Matter Content]

A sample (monomer mixed solution, etc.) was precisely weighed using a heat-resistant container, such as a metal cup, etc., and the precisely measured weight of the sample was defined as "A" g. The heat-resistant container containing the sample was placed in an electric oven, and then heated and dried while raising the temperature of the oven gradually: 120° C. for 12 minutes, 180° C. for 12 minutes, 260° C. for 30 minutes, and 300° C. for 30 minutes. The solid matter weight (nonvolatile matter weight) thus determined was defined as "B" g. Five A values and five B values obtained from the same sample were measured (n=5), and applied to the following formula (I) to determine the nonvolatile matter content. The average of the values obtained from the five samples was defined as the nonvolatile matter content in the invention.

$$\text{Nonvolatile matter content}=B/A\times100(\%) \qquad (I)$$

EXAMPLE A-1

716.0 g (2.0 mol) of 2,3,3',4'-biphenyltetracarboxylic acid dimethyl ester (half esterified product formed by the reaction of 2 mol of methyl alcohol per mol of 2,3,3',4'-biphenyltetracarboxylic dianhydride) and 400.0 g (2.0 mol) of 4,4'-diaminodiphenyl ether were mixed at room temperature in 1540 g of NMP solvent. The mixture was dissolved uniformly to form a solution. This solution had a nonvolatile matter content of 34.6% by weight and a solution viscosity of about 250 mPa·s. The solution substantially did not undergo polycondensation and therefore was stable in a monomeric state. Hereinafter, this solution is referred to as "asymmetric monomer solution A".

716.0 g (2.0 mol) of 3,3',4,4'-biphenyl tetracarboxylic acid dimethyl ester (half esterified product formed by the reaction of 2 mol of methyl alcohol per mol of 3,3',4,4'-biphenyltetracarboxylic dianhydride) and 400.0 g (2.0 mol) of 4,4'-diaminodiphenyl ether were mixed at room temperature in 1540 g of NMP solvent. The mixture was uniformly dissolved to form a solution. This solution had a nonvolatile matter content of 34.6% by weight and a solution viscosity of about 250 mPa·s. The solution substantially did not undergo polycondensation and therefore was stable in a monomeric state. Hereinafter, this solution is referred to as "symmetric monomer solution B".

The asymmetric monomer solution A and the symmetric monomer solution B were mixed thoroughly in the proportions shown in the rows of Ex. 1 and Ex. 2 of Table A-1 with 0.037% by weight (based on the nonvolatile matter content) of fluorosurfactant (EF-351, a product of Tohkem Products), followed by degassing, giving a monomer solution C. A predetermined amount of the solution was weighed out from the monomer solution C. Each solution was injected into a rotating drum; and films were formed under the following conditions.

Rotating drum: A metal drum with a mirror-finished inner surface having an inner diameter of 100 mm and a width of 530 mm was placed on two rotating rollers in such a manner as to rotate with the rotation of the rollers.

Injection amount of film-formation monomer solution C: 45.9 g

Heating temperature: A far-infrared heater was placed on the outer surface of the drum, so that the temperature of the inner surface of the drum was adjusted to be 170° C.

45.9 g of each monomer solution was uniformly injected into the bottom of the rotating drum in a non-rotating state.

Immediately thereafter, rotation of the drum was started, and the rotation rate was gradually increased to 24 rad/s. Subsequently, the solution was uniformly applied over the entire inner surface of the drum by pouring it thereon, followed by heating. The heating temperature was increased gradually to 170° C., at which the drum was further heated for 90 minutes while continuously rotating.

After the 90-minute heating and rotation was complete, the drum was cooled to room temperature. The rotating drum was then taken off, and left to stand in a hot air circulating oven to be heated for imidization. The content was heated while gradually raising the heating temperature to 350° C., at which the content was further heated for 30 minutes, followed by cooling to room temperature. The tubular PI film formed on the inner surface of the drum was peeled off and removed. The measurement results obtained in each Example are shown in Table A-2.

Table A-1 in the same manner as in Example A-1. Thereafter, 14.0 g (8.33 parts by weight per 100 parts by weight of the total amount of all the monomers) of CB powder (pH 3, particle diameter of 23 nm) was added to the solution. The mixture was thoroughly mixed and dispersed using a ball mill, and finally degassed, yielding a film-formation semi-conductive monomer solution. The film-formation semi-conductive monomer solution had a nonvolatile matter content of 36.8% by weight and a CB content in the nonvolatile matter of 9.19% by weight.

45.9 g of the solution was weighed out, and poured into a rotating drum in the same manner as in Example A-1. The result was formed and imidized under the same conditions as in Example A-1. The imidized film was peeled off and removed for measurement. The measurement results of the sample are shown in Table A-2.

TABLE A-1

| | Ex. No. | Weight ratio of asymmetric monomer solution A and symmetric monomer solution B | | Mol % of asymmetric monomer solution A and symmetric monomer solution B | | CB powder amount, per 100 parts by weight of starting material monomer |
|---|---|---|---|---|---|---|
| | | Solution A | Solution B | Solution A | Solution B | (parts by weight) |
| Ex. A-1 | 1 | 200 | 200 | 50 | 50 | 0 |
| | 2 | 80 | 320 | 20 | 80 | 0 |
| Com. Ex. A-1 | 3 | 280 | 120 | 70 | 30 | 0 |
| | 4 | 40 | 360 | 10 | 90 | 0 |
| | 5 | 0 | 200 | 0 | 100 | 0 |
| | 6 | 200 | 0 | 100 | 0 | 0 |
| Ex. A-2 | 7 | 200 | 200 | 50 | 50 | 8.33 |
| Com. | 8 | 280 | 120 | 70 | 30 | 8.33 |
| Ex. A-2 | 9 | 40 | 360 | 10 | 90 | 8.33 |

TABLE A-2

| Ex. No | Film Thickness (μm) | Yield stress $\sigma_y$ (MPa) | Tensile strength $\sigma_{Cr}$ (MPa) | $\sigma_{Cr}/\sigma_y$ | VR ($\Omega \cdot cm$) | SR ($\Omega$/sq) | Note |
|---|---|---|---|---|---|---|---|
| Ex. A-1  1 | 85 | 132.5 | 147 | 1.11 | $2.8 \times 10^{14}$ | $1.0 \times 10^{16}$ | |
| Com. Ex. A-1  2 | 85 | 145 | 172.5 | 1.19 | Same as above | Same as above | |
| 3 | 85 | 123.5 | 123.5 | 1 | Same as above | Same as above | |
| 4 | — | — | — | — | — | — | fragile and unmeasurable |
| 5 | — | — | — | — | — | — | fragile and unmeasurable |
| 6 | 85 | 116 | 117.5 | 0.99 | $2.8 \times 10^{14}$ | $1.0 \times 10^{16}$ | |
| Ex. A-2  7 | 85 | 131 | 144.5 | 1.1 | $3.0 \times 10^{10}$ | $1.4 \times 10^{12}$ | |
| Com. Ex. A-2  8 | 85 | 119.5 | 120 | 1 | $4.2 \times 10^{10}$ | $5.0 \times 10^{12}$ | |
| 9 | — | — | — | — | — | — | fragile and unmeasurable |

COMPARATIVE EXAMPLE A-1

The same procedure as in Example A-1 was performed except that the asymmetric monomer solution A and the symmetric monomer solution B as prepared in Example A-1 were mixed in the proportions shown in the rows of Exs. 3 to 6 of Table A-1. The results of each example are shown in Table A-2.

EXAMPLE A-2

The asymmetric monomer solution A and the symmetric monomer solution B as prepared in Example A-1 were uniformly mixed in the proportions shown in the row of Ex. 7 of

COMPARATIVE EXAMPLE A-2

The asymmetric monomer solution A and the symmetric monomer solution B as prepared in Example A-1 were uniformly mixed in the proportions shown in the rows of Exs. 8 and 9 of Table A-1 in the same manner as in Example A-1. Thereafter, CB powder was added to each solution in an amount of 8.33 parts by weight, per 100 parts by weight of the total amount of all the monomers in the same manner as in Example A-2. Each mixture was thoroughly mixed and dispersed using a ball mill, and finally degassed, yielding a film-formation semi-conductive monomer solution. Each film-formation semi-conductive monomer solution had a nonvolatile matter content of 36.8% by weight and a CB content in the nonvolatile matter of 9.19% by weight.

45.9 g of each solution was weighed out, and poured in a rotating drum in the same manner as in Example A-1. The results were formed and imidized under the same conditions as in Example A-1. The imidized films were peeled off and removed for measurement. The measurement results of each film are shown in Table A-2.

B. SECOND EMBODIMENT

The second embodiment will be described below in much greater detail with reference to examples and comparative examples.

EXAMPLE B-1

358.0 g (1.0 mol) of 2,3,3',4'-biphenyltetracarboxylic acid dimethyl ester (diester product formed by the reaction of 2 mol of methyl alcohol per mol of 2,3,3',4'-biphenyltetracarboxylic dianhydride), 358.0 g (1.0 mol) of 3,3',4,4'-biphenyl tetracarboxylic acid dimethyl ester (diester product formed by the reaction of 2 mol of methyl alcohol per mol of 3,3',4, 4'-biphenyltetracarboxylic dianhydride), and 400 g (2 mol) of 4,4'-diaminodiphenylether were mixed and uniformly dissolved in 1674 g of NMP solvent at 60° C. to form a solution. Subsequently, the solution was heated while raising the temperature to 100° C. over one hour, at which the solution was further heated for one hour, followed by cooling. This solution was in the oligomeric state and had a nonvolatile matter content of 32.9% by weight and a number average molecular weight of 2000, and is referred to as "oligomer mixed solution A".

To 1000 g of the oligomer mixed solution A were added 71.7 g of carbon black (CB) powder (pH 3, particle diameter 23 nm) and 142.5 g of NMP. The mixture was thoroughly mixed and dispersed using a ball mill and finally degassed, giving a film-formation semi-conductive oligomer solution. This semi-conductive oligomer solution had a nonvolatile matter content of 33.0% by weight and a CB content in the nonvolatile matter of 17.89% by weight.

109 g of the solution was weighed out, poured in a rotating drum; and formed under the following conditions.

Rotating drum: A metal drum with a mirror-finished inner surface having an inner diameter of 175 mm and a width of 540 mm was placed on two rotating rollers in such a manner as to rotate with the rotation of the rollers.

Heating temperature: A far-infrared heater was placed on the outer surface of the drum, so that the temperature of the inner surface of this drum was adjusted to be 120° C.

109 g of the solution was uniformly applied to the inner surface of the drum as it was rotating, and then heated. The heating temperature was gradually raised by 2° C./min to reach 120° C. The rotating drum was then heated at 120° C. for 90 minutes while continuously rotating.

After the rotation and heating was complete, the drum was not cooled but removed. The drum was then left to stand in a hot air-circulating oven to be heated for imidization. The drum was heated while gradually raising the heating temperature to 320° C., at which the content was further heated for 30 minutes, followed by cooling to room temperature. Subsequently, the semi-conductive tubular PI film formed on the inner surface of the drum was peeled off and removed. The thickness of the film was 90 μm.

The "nonvolatile matter content" in the specification was calculated as follows. A sample (semi-conductive oligomer solution, etc.) was precisely weighed using a heat-resistant container, such as a metal cup, etc., and the precisely-measured weight of the sample was defined as "A" g. The heat-resistant container containing the sample was placed in an electric oven, and then heated and dried while raising the temperature gradually: 120° C. for 12 minutes, 180° C. for 12 minutes, 260° C. for 30 minutes, and 300° C. for 30 minutes. The solid matter weight (nonvolatile matter weight) thus determined was defined as "B" g. Five A values and five B values obtained from the same sample were measured (n=5), and applied to the following formula (I) to determine the nonvolatile matter content. The average of the values obtained from the five samples was defined as the nonvolatile matter content in the invention.

$$\text{Nonvolatile matter content}=B/A\times100(\%) \qquad (I)$$

REFERENCE EXAMPLE B-1

Carboxylic acid dimethyl ester and diaminodiphenyl ether were mixed in the same proportions as in Example B-1, and the mixture was dissolved at 60° C. to form a solution. The solution was cooled. This solution had a nonvolatile matter content of 32.9% by weight and was substantially in a monomeric state, and is referred to as "monomer mixed solution A".

To 1000 g of the monomer mixed solution A were added 31.0 g of CB powder (pH 3, particle diameter 23 nm) and 60.0 g of NMP. The mixture was thoroughly mixed and dispersed using a ball mill and finally degassed, giving a film-formation semi-conductive monomer solution. This semi-conductive monomer solution had a nonvolatile matter content of 33.0% by weight and a CB content in the nonvolatile matter of 8.61% by weight.

109 g of the solution was weighed out. Then, in the same manner as in Example B-1, the solution was heated and formed, giving a semi-conductive tubular PI film, and the film was peeled off and removed. The thickness of the film was 92 μm.

EXAMPLE B-2

143.2 g (0.4 mol) of 2,3,3',4'-biphenyltetracarboxylic acid dimethyl ester (diester product formed by the reaction of 2 mol of methyl alcohol per 1 mol of 2,3,3',4'-biphenyltetracarboxylic dianhydride), 572.8 g (1.6 mol) of 3,3',4,4'-biphenyl tetracarboxylic acid dimethyl ester (diester product formed by the reaction of 2 mol of methyl alcohol per mol of 3,3',4, 4'-biphenyltetracarboxylic dianhydride), and 400 g (2 mol) of 4,4'-diaminodiphenylether were mixed and dissolved uniformly in 1674 g of NMP solvent at 60° C. to form a solution. Subsequently, the solution was heated while raising the temperature to 110° C. over one hour, at which the solution was further heated for one hour, followed by cooling. This solution was in the oligomeric state and had a nonvolatile matter content of 32.9% by weight and a number average molecular weight of 4000, and is referred to as "oligomer mixed solution B".

To 1000 g of the oligomer mixed solution B were added 78.9 g of CB powder (pH 3, particle diameter 23 nm) and 157.1 g of NMP. The mixture was thoroughly mixed and dispersed using a ball mill and finally degassed, giving a film-formation semi-conductive oligomer solution. This semi-conductive oligomer solution had a nonvolatile matter content of 33.0% by weight and a CB content in the nonvolatile matter of 19.34% by weight.

109 g of the solution was weighed out, and poured in a rotating drum. In the same manner as in Example B-1, the solution was heated and formed, giving a semi-conductive tubular PI film, and the film was peeled off and removed. The thickness of the film was 89 μm.

COMPARATIVE EXAMPLE B-1

Carboxylic acid dimethyl ester and diaminodiphenyl ether were mixed in the same proportions as in Example B-1, and the mixture was dissolved by heating at 60° C., to form a solution. Subsequently, the solution was heated while raising the temperature to 130° C. over one hour, at which the solution was further heated for one hour, followed by cooling. After cooling, the solution became turbid and formed a gel-like solid, and thus was not used for film formation.

The gel was not re-dissolved even when diluted in a solvent. The measurement of imidization proportion of the gel formed showed that approximately 35% imidization proceeded. This is presumably because the heating temperature was too high and therefore imidization excessively proceeded, which lowered the solubility and thus the resin content was precipitated.

TEST EXAMPLE B-1

The film formation conditions of Examples B-1, B-2, Reference Example B-1, and Comparative Example B-1, and the measured electrical resistivities of the films obtained are shown in Table B-1. Table B-1 shows the average and standard deviations of surface resistivities and volume resistivities in terms of log.
[Number Average Molecular Weight]
The number average molecular weight was determined by GPC (solvent: NMP, calculated with reference to polyethylene oxide).
[Imidization Proportion]
The imidization proportion was determined using an infrared spectroscopy based on an intensity ratio of imide absorption (1780 cm$^{-1}$) and benzene ring absorption (1510 cm$^{-1}$). The benzene ring absorption was used as a control because it did not change in an imide precursor or imidized product.
[Measurement of Surface Resistivity (SR) and Volume Resistivity (VR)]
A sample 400 mm long was cut from the obtained tubular film and was measured using a resistivity meter, "Hiresta IP/HR probe" manufactured by Mitsubishi Chemical Corporation at 12 points in total: three points in the width direction and four points in the vertical direction (circumference) at the same pitch. The average values were then obtained.

Note that the volume resistivity VR was measured while applying a voltage of 100 V, 10 seconds after beginning to apply the voltage and SR was measured while applying a voltage of 500 V, 10 seconds after beginning to apply the voltage.

TABLE B-1

| | Heating temperature | Number average molecular weight | Imidization proportion | Ratio of asymmetric component to symmetric component | | CB powder content in a film | Film thickness | Surface resistivity of the film-front surface (log SR) | |
|---|---|---|---|---|---|---|---|---|---|
| | | | | Asymmetric | Symmetric | | | Av. | Standard deviation |
| Ex. B-1 | 100° C. | 2000 | 10% | 50 | 50 | 17.89 | 90 μm | 11.77 | 0.11 |
| Ex. B-2 | 110° C. | 4000 | 20% | 20 | 80 | 19.34 | 89 μm | 11.93 | 0.11 |
| Ref. Ex. B-1 | 60° C. | 250 | 0% | 50 | 50 | 8.61 | 92 μm | 11.99 | 0.30 |
| Com. Ex. B-1 | 130° C. | | 35% | 50 | 50 | | | | |

| | Surface resistivity of the film-rear surface | | Volume resistivity (log VR) | | Difference in surface resistivities | |
|---|---|---|---|---|---|---|
| | Av. | Standard deviation | Av. | Standard deviation | between front and rear surfaces | logSR − log VR |
| Ex. B-1 | 11.87 | 0.09 | 9.88 | 0.11 | 0.10 | 1.89 |
| Ex. B-2 | 12.07 | 0.13 | 10.49 | 0.08 | 0.14 | 1.44 |
| Ref. Ex. B-1 | 12.40 | 0.25 | 12.10 | 0.43 | 0.41 | −0.11 |
| Com. Ex. B-1 | | | | | | |

Note:
Average and standard deviations of surface resistivities and volume resistivities in terms of log
Measurement of resistivity: 3 points in the belt-width direction × 4 points in the circumferential direction = 12 points in total
Voltage application: while applying a voltage of 100 V, 10 seconds after beginning to apply the voltage
Resistivity meter: Hiresta IP/HR probe Table B-1 shows that the standard deviations of the surface resistivities and the volume resistivities of the films of the Examples are very small, i.e., less variation, compared with those the films of Reference Examples and Comparative Examples.

Moreover, the differences in surface resistivities (in terms of log) between the front and rear surfaces of the films of Examples are extremely small, and thus are preferable as intermediate transfer belts for use in color copiers.

Furthermore, in general, an increase in the heating temperature elevation rate during film formation lowers the value (Log (SR/VR)) obtained by subtracting volume resistivity in terms of log (LogVR) from the surface resistivity in terms of log (LogSR). Therefore, the use of a film with such characteristic for a transfer belt results in failure of appropriate electrically charging and/or electrically discharging, which leads to poor image quality. It was however confirmed that this value is maintained as high as 1.0-3.0 by the use of an oligomer mixed solution, thereby further increasing film productivity.

C. THIRD EMBODIMENT

The third embodiment will be described in much greater detail with reference to Examples and Comparative Examples. Hereinafter, 2,3,3',4'-biphenyltetracarboxylic dianhydride is referred to as "a-BPDA" and 3,3',4,4'-biphenyl tetracarboxylic dianhydride is referred to as "s-BPDA". The number average molecular weight was measured by GPC (solvent: NMP).

EXAMPLE C-1

22.8 g of methanol and 160 g of N-methyl-2-pyrrolidone were added to 14 g (20 mol %) of a-BPDA and 56 g (80 mol %) of s-BPDA to react at a bath temperature of 70° C. under a nitrogen stream. After cooling the bath temperature to 65° C., 47.6 g of 4,4'-diaminodiphenyl ether (ODA) was added, followed by gentle stirring, giving 300.4 g of nylon salt monomer solution. This solution had a viscosity of 1.8 poise and a nonvolatile matter content of 36.3% by weight.

Separately, 47.6 g of ODA was added to 488 g of N-methyl-2-pyrrolidone under a nitrogen stream. The mixture was kept warm at 50° C., and then completely dissolved by stirring. A powder comprising a mixture of 35 g of a-BPDA and 35 g of s-BPDA was gradually added to this solution, giving 605.6 g of a polyamic acid solution. This polyamic acid solution had a number average molecular weight of 16000, viscosity of 30 poise, and nonvolatile matter content of 18.0% by weight.

100 g of the nylon salt monomer solution and 80 g of the polyamic acid solution were mixed, giving 180 g of a polyimide-based precursor solution having a viscosity of 13 poise and nonvolatile matter content of 28.2% by weight.

7.5 g of acidic carbon black (pH 3.0) and 16.7 g of N-methyl-2-pyrrolidone were added to 150 g of this precursor solution to uniformly disperse the carbon black using a ball mill. This masterbatch solution had a nonvolatile matter content of 28.6% by weight; CB content in the nonvolatile matter of 15.1% by weight; mean particle diameter of carbon black of 0.28 μm; and maximum particle diameter of carbon black of 0.58 μm. Ten days Later, the mean particle diameter and maximum particle diameter of the carbon black hardly changed, and were 0.28 μm and 0.76 μm, respectively.

The "nonvolatile matter content" in the specification was calculated as follows. A sample (nylon salt monomer solution, etc.) was precisely weighed using a heat-resistant container, such as a metal cup, etc., and the precisely-measured weight of the sample was defined as "A" g. The heat-resistant container containing the sample was placed in an electric oven, and then heated and dried while raising the temperature gradually: 120° C. for 12 minutes, 180° C. for 12 minutes, 260° C. for 30 minutes, and 300° C. for 30 minutes. The solid matter weight (nonvolatile matter weight) obtained was defined as "B" g. Five A values and five B values obtained from the same sample were measured (n=5), and applied to the following formula (I) to determine nonvolatile matter content. The average of the values obtained from the five samples was defined as the nonvolatile matter content in the invention.

$$\text{Nonvolatile matter content} = B/A \times 100(\%) \quad (I)$$

EXAMPLE C-2

22.8 g of methanol and 160 g of N-methyl-2-pyrrolidone were added to 35 g (50 mol %) of a-BPDA and 35 g (50 mol %) of s-BPDA to react at a bath temperature of 80° C. under a nitrogen stream. After cooling the bath temperature to 65° C., 47.6 g of 4,4'-diaminodiphenyl ether (ODA) was added, followed by gentle stirring, giving 300.4 g of nylon salt monomer solution. This solution had a viscosity of 1.8 poise and a nonvolatile matter content of 36.3% by weight.

Separately, 47.6 g of ODA was added to 488 g of N-methyl-2-pyrrolidone under a nitrogen stream. The mixture was kept warm at 50° C., and completely dissolved by stirring. 70 g of s-BPDA was gradually added to this solution, giving 605.6 g of a polyamic acid solution. This polyamic acid solution had a number average molecular weight of 12000, viscosity of 12 poise, and nonvolatile matter content of 18.0% by weight.

100 g of the nylon salt monomer solution and 80 g of the polyamic acid solution were mixed, giving 180 g of a polyimide-based precursor solution having a viscosity of 5.2 poise and a nonvolatile matter content of 28.2% by weight.

7.5 g of acidic carbon black (pH 3.0) and 16.7 g of N-methyl-2-pyrrolidone were added to 150 g of this precursor solution to uniformly disperse the carbon black using a ball mill. This masterbatch solution had a nonvolatile matter content of 28.6% by weight; CB content in the nonvolatile matter of 15.1% by weight; mean particle diameter of carbon black of 0.31 μm; and maximum particle diameter thereof of 0.77 μm. Ten days later, the mean particle diameter and maximum particle diameter of the carbon black hardly changed, and were 0.31 μm and 0.88 μm, respectively.

EXAMPLE C-3

22.8 g of methanol and 250 g of N-methyl-2-pyrrolidone were added to 21 g (30 mol %) of a-BPDA and 49 g (70 mol %) of s-BPDA to react at a bath temperature of 80° C. under a nitrogen stream. After cooling the bath temperature to 65° C., 47.6 g of 4,4'-diaminodiphenylether (ODA) was added, followed by gentle stirring, giving 390.4 g of nylon salt monomer solution. This solution had a viscosity of 0.7 poise and nonvolatile matter content of 27.9% by weight.

To 200 g of the nylon salt monomer solution was added 110 g of a polyamideimide solution (VYLOMAX HR-16NN, a product of TOYOBO) having a number average molecular weight of 21000, solids content of 14% by weight, and viscosity of 500 poise), giving 310 g of polyimide-based precursor solution having a viscosity of 18 poise and a nonvolatile matter content of 23.0% by weight.

10.9 g of acidic carbon black (pH 3.0) and 25.2 g of N-methyl-2-pyrrolidone were added to 260 g of this precursor solution to uniformly disperse the carbon black using a ball mill. This masterbatch solution had a nonvolatile matter content of 23.9% by weight; CB content in the nonvolatile matter of 15.4% by weight; mean particle diameter of carbon black of 0.215 μm; and the maximum particle diameter of carbon black of 0.51 μm. Ten days later, the mean particle diameter and maximum particle diameter of the carbon black hardly changed, and were 0.218 μm and 0.58 μm, respectively.

REFERENCE EXAMPLE C-1

To 200 g of the nylon salt monomer solution as prepared in Example C-1 were added 13.5 g of acidic carbon black (pH 3.0) and 120 g of organic solvent (NMP). The mixture was primarily dispersed using a ball mill. This solution had a viscosity of 5 poise; nonvolatile matter content of 25.8% by weight; CB content in the nonvolatile matter of 15.7% by weight; mean particle diameter of carbon black of 0.39 μm; and maximum particle diameter of carbon black of 2.26 μm. Ten days later, the mean particle diameter and maximum particle diameter of the carbon black were 0.79 μm and 7.70 μm, respectively. It was confirmed that the carbon black particles had aggregated.

REFERENCE EXAMPLE C-2

47.6 g of ODA was added to 450 g of N-methyl-2-pyrolidone under a nitrogen stream. The mixture was kept warm at 50° C., and completely dissolved by stirring. 70 g of s-BPDA was gradually added to this solution, giving 567.6 g of polyamic acid solution. This polyamic acid solution had a number average molecular weight of 5000, viscosity of 6.6 poise, and nonvolatile matter content of 19.2% by weight. 80 g of this solution and 100 g of the nylon salt monomer solution as prepared in Example C-2 were mixed, giving 180 g of a polyimide-based precursor solution. To this precursor solution were added 9.5 g of acidic carbon black (pH 3.0) and 120 g of organic solvent (NMP). The mixture was primarily dispersed using a ball mill. This solution had a viscosity of 6 poise; nonvolatile matter content of 19.8% by weight; CB content in the nonvolatile matter of 15.5% by weight; mean particle diameter of carbon black of 0.26 μm; and maximum particle diameter of 0.87 μm. Ten days later, the mean particle diameter and maximum particle diameter of the carbon were 0.77 μm and 5.10 μm, respectively. It was confirmed that the carbon black particles had aggregated.

EXAMPLE C-4

Preparation of a Tubular Polyimide-Based Film by Rotational Molding)

The solutions as prepared in Examples C-1, C-2, C-3, and Reference Examples C-1 and C-2 were uniformly applied, in a width of 480 mm, to the inside of cylindrical metal molds with an outer diameter of 300 mm, inner diameter of 270 mm, and length of 500 mm while rotating the metal mold at rotational speed of 100 rpm (10.5 rad/s). The coating thickness was determined based on the nonvolatile matter content in such a manner as to obtain a polyimide belt thickness of 100 μm. The solvent was evaporated by heating to 110° C. over 60 minutes, and further heating while maintaining the temperature at 110° C. for 120 minutes. Thus, a self-supporting tubular article was obtained.

Subsequently, this tubular article was placed in a high temperature heating furnace while adhered to the inside of the cylindrical metal mold. The temperature of the furnace was increased to 320° C. over 120 minutes, at which the furnace was heated for 60 minutes for polyimidization, giving a tubular polyimide film. After cooling to room temperature, the tubular polyimide film was removed from the metal mold. The surface condition was evaluated visually.

The surface resistivity (SR) and volume resistivity (VR) were measured as follows. A sample 400 mm long was cut from the obtained tubular polyimide film and was measured using a resistivity meter, "Hiresta IP/HR probe" manufactured by Mitsubishi Chemical Corporation at 12 points in total: three points in the width direction and four points in the vertical direction (circumference) at the same pitch. The average values were then obtained.

Note that the volume resistivity VR was measured while applying a voltage of 100 V, 10 seconds after beginning to apply the voltage and SR was measured while applying a voltage of 500 V, 10 seconds after beginning to apply the voltage.

The measurement results are summarized in Table C-1. Table C-1 shows the average and standard deviations of surface resistivities and volume resistivities in terms of log. Note that the CB content in the tubular article and the thickness thereof are also shown in Table C-1.

TABLE C-1

| | | Ex. C-1 | Ex. C-2 | Ex. C-3 | Ref. Ex. C-1 | Ref. Ex. C-2 |
|---|---|---|---|---|---|---|
| Surface condition | | Fine | Fine | Fine | Aggregate | Aggregate |
| Front surface resistivity Log (Ω/sq) | Average | 10.28 | 10.51 | 10.34 | 7.01 | 8.84 |
| | Standard deviation | 0.15 | 0.07 | 0.03 | 0.05 | 0.10 |
| Rear surface resistivity Log (Ω/sq) | Average | 10.31 | 10.53 | 10.37 | 8.83 | 10.28 |
| | Standard deviation | 0.14 | 0.07 | 0.03 | 0.61 | 0.14 |
| Volume resistivity Log (Ω·cm) | Average | 8.63 | 8.63 | 8.92 | 9.64 | 8.7 |
| | Standard deviation | 0.07 | 0.04 | 0.06 | 0.26 | 0.2 |
| Difference in surface resistivities between front and rear surfaces | Index | 0.02 | 0.02 | 0.03 | 1.82 | 1.44 |
| Difference in surface resistivities between front and rear surfaces | Index | 1.66 | 1.88 | 1.42 | −2.62 | 0.14 |
| CB content (% by weight) | | 15.1 | 15.1 | 15.4 | 15.7 | 15.5 |
| Average thickness (μm) | | 100 | 100 | 100 | 100 | 100 |

Table C-1 shows that the standard deviations of the surface resistivities and the volume resistivities in the tubular articles of Examples are very small, i.e., less variation, compared with those of the tubular articles of the Reference Examples.

Moreover, the differences in surface resistivities terms of log) between the front and rear surfaces of the tubular articles of Examples are extremely small compared with those of the tubular articles of the Reference Examples, and thus the tubular articles of Examples have advantageous properties as intermediate transfer belts for use in electrographic systems.

Furthermore, in general, an increase in the heating temperature elevation rate during film formation lowers the value (Log (SR/VR)) obtained by subtracting the volume resistivity in terms of log (LogVR) from the surface resistivity in terms of log (LogSR). Therefore, the use of a film with such characteristics for a transfer belt results in failure of appropriate electrically charging and/or electrically discharging, which leads to poor image quality. It was however found that this value is maintained as high as 1.0-2.0 by the use of a semi-conductive PI precursor composition of the invention.

In contrast, the front surface resistivities of the tubular articles of the Reference Examples were smaller than the rear surface resistivities thereof. A concentration gradient of carbon black presumably occurred in the thickness direction of the tubular articles. As a result, the volume resistivity was high and variation was large.

D. FOURTH EMBODIMENT

The fourth embodiment will be described in much greater detail with reference to Examples and Comparative Examples. Hereinafter, 2,3,3',4'-biphenyltetracarboxylic dianhydride is referred to as "a-RPDA" and 3,3',4,4'-biphenyltetracarboxylic dianhydride is referred to as "s-BPDA".

EXAMPLE D-1

To 153 g of N-methyl-2-pyrrolidone as an organic polar solvent, 27 g of acidic carbon black (pH 3.0, volatile matter 14.5%) was added. The mixture was preliminarily dispersed, followed by primary dispersion using a ball mill. The mean particle diameter of carbon black was 0.29 μm and the maximum particle diameter thereof was 0.55 μm. Subsequently, to 120 g of this solution, 22.8 g of methanol, 14 g of a-BPDA and 56 g of s-BPDA were added to react at a bath temperature of 60° C. under a nitrogen stream.

After cooling the bath temperature to 50° C., 47.6 g of 4,4'-diaminodiphenyl ether (ODA) was added, followed by gentle stirring, giving 260 g of a carbon black-dispersed high-concentration polyimide-precursor composition comprising monomers. The solution had a viscosity of 32 poise; nonvolatile matter content of 48.9% by weight; CB content in the nonvolatile matter of 14.2% by weight; mean particle diameter of carbon black of 0.29 μm; and maximum particle diameter thereof of 0.58 μm. Ten days later, the mean particle diameter and the maximum particle diameter of the carbon black hardly changed, and were 0.31 μm and 0.67 μm, respectively.

The "nonvolatile matter content" in the specification was calculated as follows. A sample (carbon black-dispersed high-concentration polyimide-precursor composition) was precisely weighed using a heat-resistant container, such as a metal cup, etc., and the precisely-measured weight of the sample was defined as "A" g. The heat-resistant container containing the sample was placed in an electric oven, and then heated and dried while raising the temperature gradually: 120° C. for 12 minutes, 180° C. for 12 minutes, 260° C. for 30 minutes, and 300° C. for 30 minutes. The solid matter weight (nonvolatile matter weight) obtained was defined as "B" g. Five A values and five B values obtained from the same sample were measured (n=5), and applied to the following formula (I) to determine the nonvolatile matter content. The average of the values obtained from the five samples was defined as the nonvolatile matter content in the invention.

Nonvolatile matter content=$B/A \times 100 (\%)$ (I)

EXAMPLE D-2

To 120 g of N-methyl-2-pyrrolidone as an organic polar solvent, 10 g of furnace black (pH 9.0, volatile matter 1.5%) was added. The mixture was preliminarily dispersed, followed by primary dispersion using a ball mill. The mean particle diameter of carbon black was 0.67 μm and the maximum particle diameter thereof was 3.92 μm. Subsequently, to 125 g of this solution, 35 g of a-BPDA, 35 g of s-BPDA, and 22.8 g of methanol were added to react at a bath temperature of 70° C. under a nitrogen stream. After cooling the bath temperature to 50° C., 47.6 g of 4,4'-diaminodiphenyl ether (ODA) was added, followed by gentle stirring, giving 265 g of a carbon black-dispersed high-concentration polyimide-precursor composition comprising monomers. This solution had a viscosity of 12 poise; nonvolatile matter content of 44.7% by weight; CB content in the nonvolatile matter of 8.2% by weight; mean particle diameter of carbon black of 0.77 μm; and maximum particle diameter of carbon black of was 3.92 μm. Ten days later, the mean particle diameter and the maximum particle diameter of the carbon black hardly changed, and were 0.77 μm and 4.47 μm, respectively.

COMPARATIVE EXAMPLE D-1

To 600 g of high-molecular-weight polyamic acid solution prepared from s-BPDA and ODA (viscosity 50 poise, nonvolatile matter content 18.0% by weight), 20 g of acidic carbon black (pH 3.0, volatile matter 14.5%) was added, followed by primary dispersion using a ball mill. The resultant had a high viscosity and was in a gel-like form. The solution was then redispersed by adding 300 g of organic solvent (NMP). This solution had a viscosity of 8 poise; nonvolatile matter content of 13.9% by weight; CB content in the nonvolatile matter of 15.6% by weight; mean particle diameter of carbon black of 0.32 μm; and maximum particle diameter thereof of 0.77 μm. Ten days later, the mean particle diameter and maximum particle diameter of the carbon black hardly changed, and were 0.32 μm and 0.77 μm, respectively.

REFERENCE EXAMPLE D-1

To 35 g (50 mol %) of a-BPDA and 35 g (50 mol %) of s-BPDA, 22.8 g of methanol and 160 g of N-methyl-2-pyrrolidone were added to react under a nitrogen stream at a bath temperature of 70° C. After cooling the bath temperature to 60° C., 47.6 g of 4,4'-diaminodiphenyl ether (ODA) was added, followed by gentle stirring, giving 300.4 g of nylon salt monomer solution. This solution had a viscosity of 1.8 poise and a nonvolatile matter content of 36.3% by weight. To this solution, 16.5 g of acidic carbon black (pH 3.0, volatile matter 14.5%) and 140 g of organic polar solvent (NMP) were added, followed by primary dispersion using a ball mill. This solution had a viscosity of 5 poise; nonvolatile matter content of 27.5% by weight; CB content in the nonvolatile matter of 12.3% by weight; mean particle diameter of carbon black of 0.47 μm; and maximum particle diameter of carbon black of 1.73 μm. Ten days later, the mean particle diameter and maximum particle diameter of the carbon black were 0.78 μm and 5.12 μm, respectively. It was confirmed that the carbon black particles had aggregated.

EXAMPLE D-3

Preparation of a Tubular Polyimide Film by Rotational Molding

The solutions as prepared in Examples D-1 and D-2, Comparative Example D-1, and Reference Example D-1 were uniformly applied, in a width of 480 mm, to the inside of cylindrical metal molds with an outer diameter of 300 mm, inner diameter of 270 mm and length of 500 mm while rotating the metal mold at rotational speed of 100 rpm (10.5 rad/s).

The coating thickness was determined based on the nonvolatile matter content in such a manner as to obtain a polyimide belt thickness of 100 μm. The solution was heated to 100° C. over 60 minutes to evaporate the solvent. Thereafter, evaporation of the solvent at 100° C. was visually observed, and the time required to complete solvent evaporation was measured.

Subsequently, the tubular article was placed in a high temperature heating furnace while adhered to the inside of the cylindrical metal mold. The temperature of the furnace was increased to 320° C. over 120 minutes, at which the furnace was heated for 60 minutes for polyimidization. After cooling to room temperature, the tubular polyimide film was removed from the metal mold. The measurement results are summarized in Table D-1. Note that the CB content in the tubular article and the thickness thereof are also shown in Table D-1.

The surface resistivity (SR) was measured as follows. A sample 400 mm long was cut from the obtained tubular polyimide film and was measured using a resistivity meter, "Hiresta IP-HR probe" manufactured by Mitsubishi Chemical Corporation at 12 points in total: three points in the width direction and four points in the vertical direction (circumference) at the same pitch. The averages of all the measured values are shown. The surface resistivity (SR) was measured while applying a voltage of 500 V, 10 seconds after beginning to apply the voltage.

The semi-conductive tubular PI film of the second embodiment has homogeneous electrical resistivity because it is formed using, as a film formation starting material, an aromatic auric acid oligomer obtained by polycondensation of a specific aromatic tetracarboxylic acid component and a specific aromatic diamine component. More specifically, the semi-conductive tubular PI film of the invention has excellent properties, such as less variation in surface and volume resistivities and small difference in surface resistivities (in terms of logarithm) between the front and rear surfaces. Moreover, the value obtained by subtracting volume resistivity in terms of log (LogVR) from surface resistivity in terms of log (LogSR) can be maintained as high as 1.0-3.0. Therefore, the semi-conductive tubular PI film of the invention can be advantageously used as an intermediate transfer belt for use in a color copier, etc., and electrically charging and/or electrically discharging can be appropriately performed, thereby achieving excellent image processing.

Since the semi-conductive tubular PI film of the third embodiment has uniform electrical resistivity because it is formed using, as a film-formation starting material, a semi-conductive polyimide-based precursor composition obtained by uniformly dispersing carbon black in a mixed solution comprising a nylon salt monomer solution and a high-molecular-weight polyimide precursor solution or high-molecu-

TABLE D-1

| Film-formation solution | Time required for evaporation of solvent (minutes) | Surface condition | Surface resistivity ($\Omega$/sq) | CB content in the tubular article (% by weight) | Thickness of the tubular article (μm) |
|---|---|---|---|---|---|
| Ex. D-1 | 45 | Fine | $2.5 \times 10^{10}$ | 14.2 | 94-102 |
| Ex. D-2 | 60 | Fine | $5.0 \times 10^{7}$ | 8.1 | 96-103 |
| Com. Ex. D-1 | 170 | Fine | $2.0 \times 10^{10}$ | 15.6 | 88-102 |
| Ref. Ex. D-1 | 110 | Aggregation of carbon black | $2.0 \times 10^{6}$ | 12.3 | 95-104 |

According to the prior-art method (Comparative Example), the production efficiency is extremely low because the nonvolatile matter content in the film-formation starting material is low and considerable time is needed to evaporate the large amount of organic polar solvent. Moreover, in a film-formation method comprising a step of adding and dispersing CB in a monomer solution, etc., the reaction of the monomer solution proceeds due to heat produced by dispersion, which makes the solution condition unstable.

EFFECTS OF THE INVENTION

The present invention can form a high-quality nonconductive or semi-conductive seamless (jointless) tubular polyimide film in a simple, efficient, and economical manner.

More specifically, according to the first embodiment, a seamless tubular PI film can be directly obtained from a polyimide monomer starting material having a specific composition with a rotationally molding member. Moreover, considerable time can be saved compared with prior-art methods for producing seamless tubular PI films via polyamic acids. In addition, the productivity is improved by significantly rationalizing production control and a more stable and higher-quality tubular PI film can also be obtained. The seamless tubular PI film obtained can be used for various applications, and in particular, a semi-conductive seamless tubular film can be used more advantageously as an intermediate transfer belt in an electrophotographic system for use in a color printer, color copier, etc.

lar-weight polyamideimide solution. Therefore, the semi-conductive tubular PI film of the invention has excellent properties, such as less variation in surface and volume resistivities and small difference in surface resistivities (in terms of logarithm) between the front and rear surfaces. Therefore, the semi-conductive tubular PI film of the invention can be suitably used as an intermediate transfer belt for use in a color copier, etc., and electrically charging and/or electrically discharging can be appropriately performed, thereby achieving excellent image processing.

In the semi-conductive high-concentration PI precursor composition of the fourth embodiment, CB powder is uniformly dispersed and the storage stability of the uniform dispersion of CB powder is remarkably improved. An electrically conductive tubular PI film prepared by rotationally molding the semi-conductive PI precursor composition has an excellent electrical conductivity; extreme stability and uniform electrical resistivity in the thickness direction. More specifically, by the use of such film for an intermediate transfer belt in an electrophotographic system for use in a color printer, color copier, etc., electrically charging and/or electrically discharging can be appropriately performed, thereby achieving excellent image processing. The semi-conductive high-concentration PI precursor composition of the invention is prepared by dissolving the film-formation starting material monomers in the carbon black dispersion, thereby dramatically increasing the nonvolatile matter content to about 35 to about 60% by weight. Therefore, the semi-conductive high-concentration PI precursor composition of the invention can readily form a thick film. Moreover, the invention can reduce the amount of solvent required for film formation, thereby lowering solvent cost and facilitating evaporation to remove a solvent.

The invention claimed is:

1. A seamless tubular polyimide film, comprising polyimide having at least two aromatic tetracarboxylic acid components having a mixture of 15 to 55 mol % of asymmetric aromatic tetracarboxylic acid component and 85 to 45 mol % of symmetric aromatic tetracarboxylic acid component and at least one aromatic diamine component, the seamless tubular polyimide film having a yield stress ($\sigma_Y$) of at least 120 MPa and having a tensile strength to yield stress stress ratio ($\sigma_{cr}/\sigma_Y$) of at least 1.10.

2. A semi-conductive seamless tubular polyimide film, wherein
carbon black is dispersed in polyimide having at least two aromatic tetracarboxylic acid components having a mixture of 15 to 55 mol % of asymmetric aromatic tetracarboxylic acid component and 85 to 45 mol % of symmetric aromatic tetracarboxylic acid component and at least one aromatic diamine component, the semi-conductive seamless tubular polyimide film having a surface resistivity of $10^3$ to $10^{15}$ Ω/sq.

3. A semi-conductive seamless tubular polyimide film according to claim 2, wherein
a log standard deviation of surface resistivity is 0.2 or smaller,
a log standard deviation of volume resistivity is 0.2 or smaller, and
a difference between a log surface resistivity and a log volume resistivity is 0.4 or smaller.

4. A method for producing a seamless tubular polyimide film, comprising:
rotationally molding a mixed solution substantially in a monomeric state having a mixture of an aromatic tetracarboxylic acid component comprising 15 to 55 mol % of asymmetric aromatic tetracarboxylic acid and/or ester thereof and 85 to 45 mol % of symmetric aromatic tetracarboxylic acid and/or ester thereof and an approximately equimolar amount of an aromatic diamine component, to form a tubular shape, and
imidizing the tubular material by heating.

5. A method for producing a semi-conductive seamless tubular polyimide film, comprising:
mixing an aromatic tetracarboxylic acid component comprising 15 to 55 mol % of asymmetric aromatic tetracarboxylic acid and/or ester thereof and 85 to 45 mol % of symmetric aromatic tetracarboxylic acid and/or ester thereof and an approximately equimolar amount of an aromatic diamine component, to form mixed solution substantially in a monomeric state,
dispersing 1 to 35 parts by weight of carbon black in the mixed solution, per 100 parts by weight of a total amount of the aromatic tetracarboxylic acid component and the aromatic diamine component, to form a semi-conductive monomer mixed solution,
rotationally molding the semi-conductive monomer mixed solution to form a tubular shape; and
imidizing the tubular material by heating.

6. A semi-conductive seamless tubular polyimide film for use in an intermediate transfer belt in an electrophotographic system produced by a production method of claim 5.

* * * * *